United States Patent [19]
Rudy

[11] Patent Number: 4,496,718
[45] Date of Patent: Jan. 29, 1985

[54] INTEGRALLY BONDED COMPOSITIONS OF CELLULOSICS AND PRODUCTS THEREOF DIRECTLY FROM WET SAWDUST AND THE LIKE

[76] Inventor: N. Jerome Rudy, 3613 Orchard Dr., P.O. Box 1391, Midland, Mich. 48641

[21] Appl. No.: 399,681

[22] Filed: Jul. 16, 1982

Related U.S. Application Data

[63] Continuation-in-part of Ser. No. 212,110, is a continuation-in-part of Ser. No. 90,829, Nov. 1, 1979, abandoned.

[51] Int. Cl.³ .................. C08B 15/00; C08B 15/10
[52] U.S. Cl. ............................... 536/56; 106/93; 106/140; 106/163.1; 264/109; 524/2; 524/13; 524/14; 162/71
[58] Field of Search ............ 106/163 R, 93, 140; 524/2, 13, 14; 162/71; 536/56; 264/109

[56] References Cited

U.S. PATENT DOCUMENTS

| | | | |
|---|---|---|---|
| 2,964,792 | 12/1960 | Yan et al. | 106/163 R |
| 3,093,607 | 6/1963 | Ayers | 106/163 R |
| 3,099,633 | 7/1963 | Black | 106/163 R |
| 3,492,388 | 1/1970 | Inglin-Knüsel | 524/13 |
| 3,705,837 | 12/1972 | Breslauer | 106/163 R |
| 3,900,334 | 8/1975 | Brink | 106/163 R |
| 4,056,400 | 11/1977 | Diamantoglou et al. | 106/163 R |
| 4,107,379 | 8/1978 | Stofko | 106/163 R |
| 4,183,997 | 1/1980 | Stofko | 106/163 R |
| 4,354,879 | 10/1982 | Griffin et al. | 106/163 R |

FOREIGN PATENT DOCUMENTS

| | | | |
|---|---|---|---|
| 564146 | 9/1958 | Canada | 162/71 |
| 2141564 | 1/1973 | France | 524/13 |
| 48-20215 | 6/1973 | Japan | 524/13 |

Primary Examiner—Ronald W. Griffin

[57] ABSTRACT

At least substantially, if not entirely, undried comminutated fibrous plant cellulosic materials, particularly "wet" sawdust, is made into integrally bonded composition and shaped and fabricated articles therefrom using an inexpensive, exceptionally and adequately hydrophylic binder which under certain conditions and in particularized situations may be prepared with minimized (and sometimes even no or essentially no) artificially-induced thermal drying requirements in or for the production of cohesively-resultant, particulate-containing artificial wood and equivalent products capable of replacing natural stock; the binder constituent for the accomplishment of same being, for example and without limitation(s), ordinary household bleach (i.e., aqueous sodium hypochlorite) composition(s) and its like, more-strongly-concentrated preparations and/or possible equivalents thereof and substitutes therefor such as bleach powder (i.e., calcium hypochlorite), swimming pool chlorine/bromine- and oxygen-release compounds, elemental chlorine and so forth to get a complex carbohydrate break-down resulting in an internally-so-generated hydrophylic, water-absorptive (i.e., actually water-absorbing) and binding adhesive material. The "wet" sawdust or equivalent undried cellulosic raw material may oftentimes with considerable benefit be admixed with certain types of lower carbohydrates, such as plain starch from wheat, corn, soybeans, potatoes, etc., and even sugar, to facilitate the integral bonding effect of being directly converted to a desired shaped-article product. Other functional additives may also be selectively and usefully for certain desired end results be incorporated in the "wet" sawdust and the like compositions and products.

97 Claims, 11 Drawing Figures

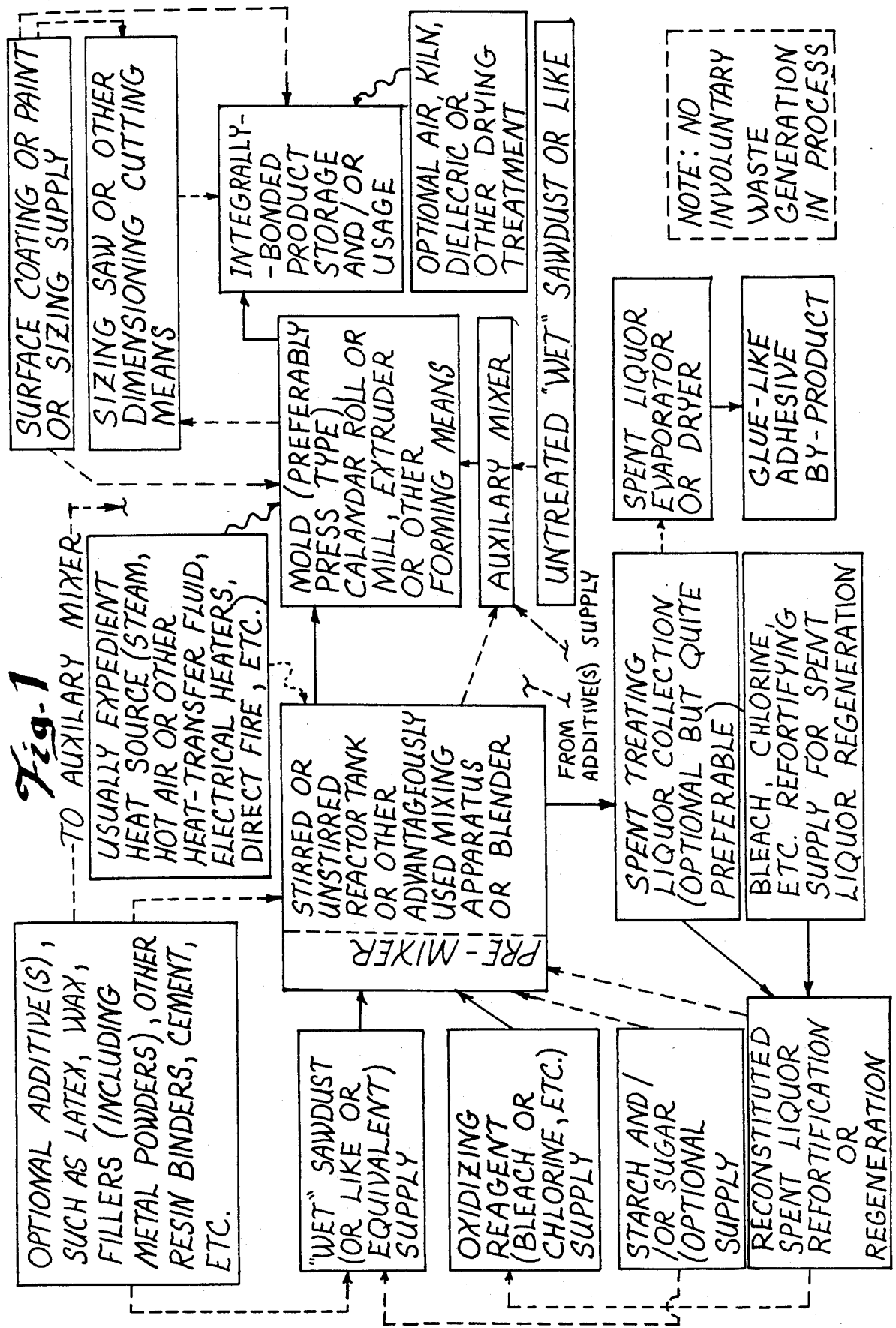

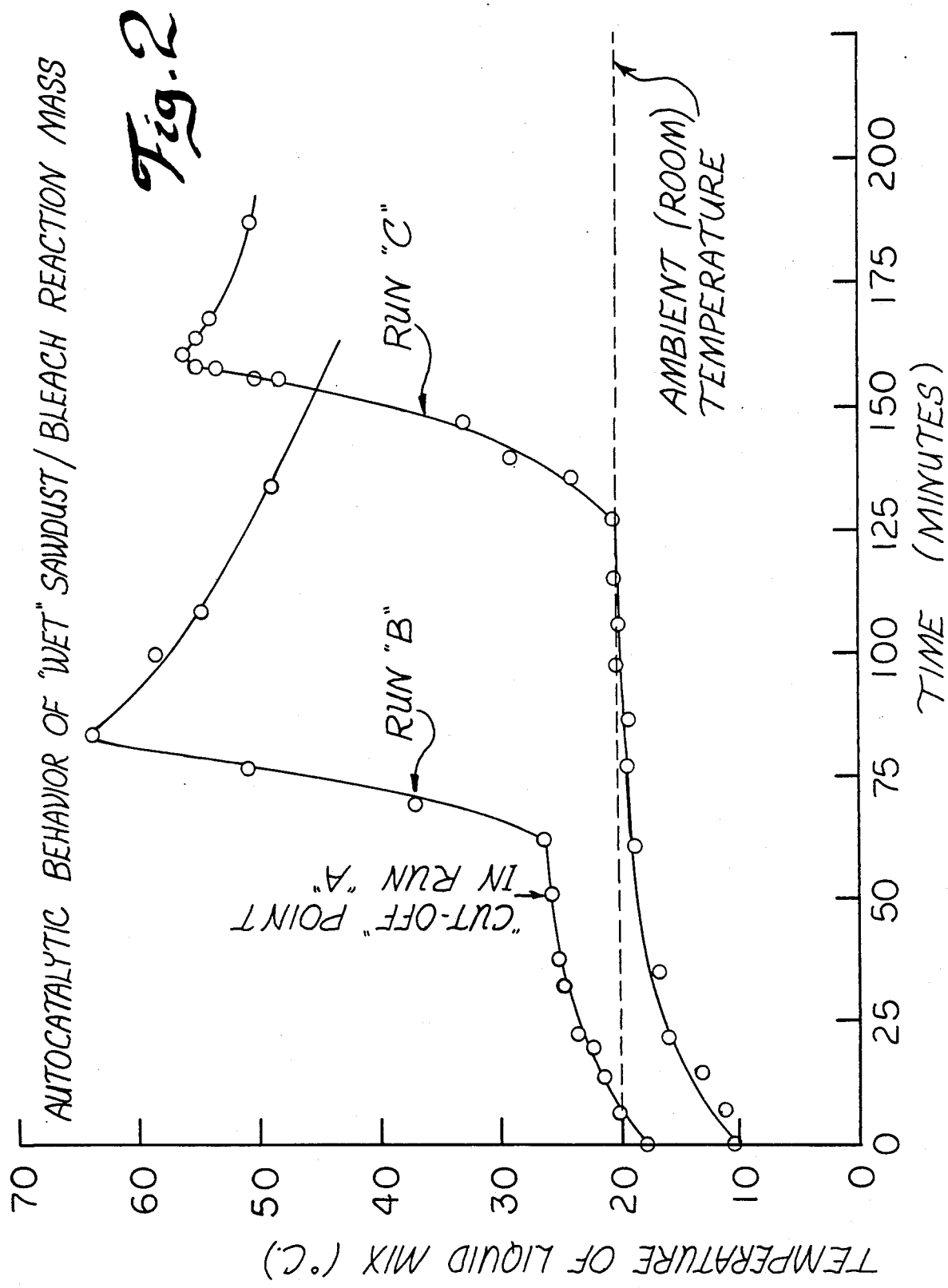

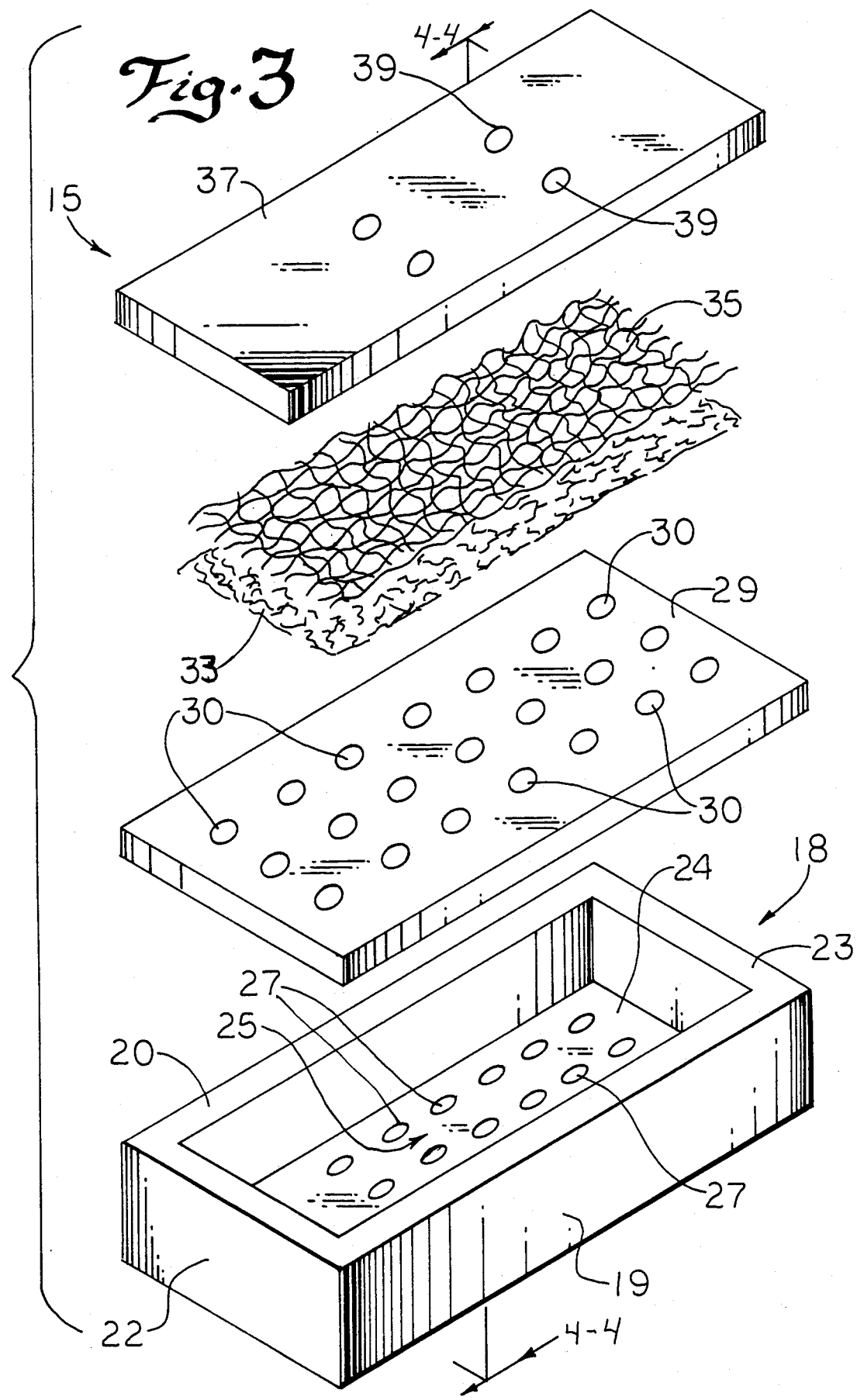

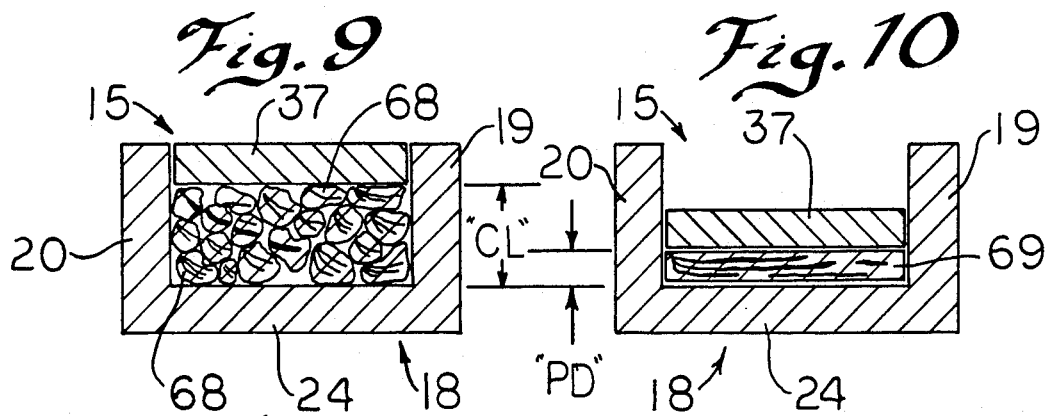
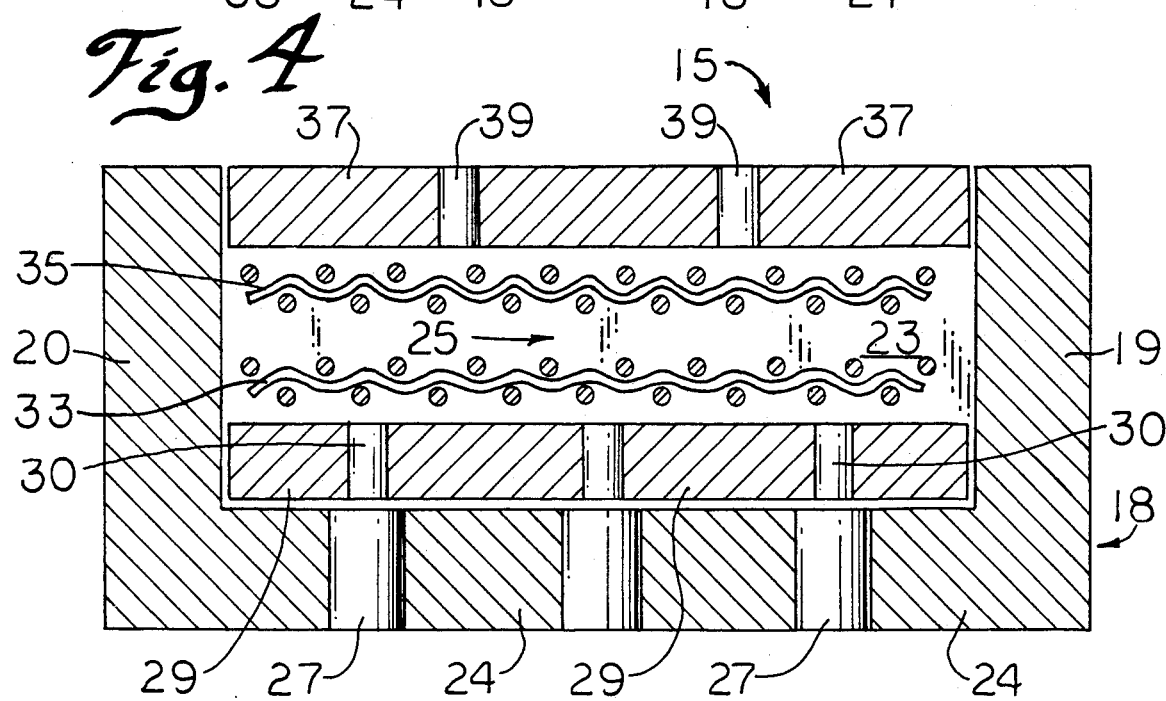
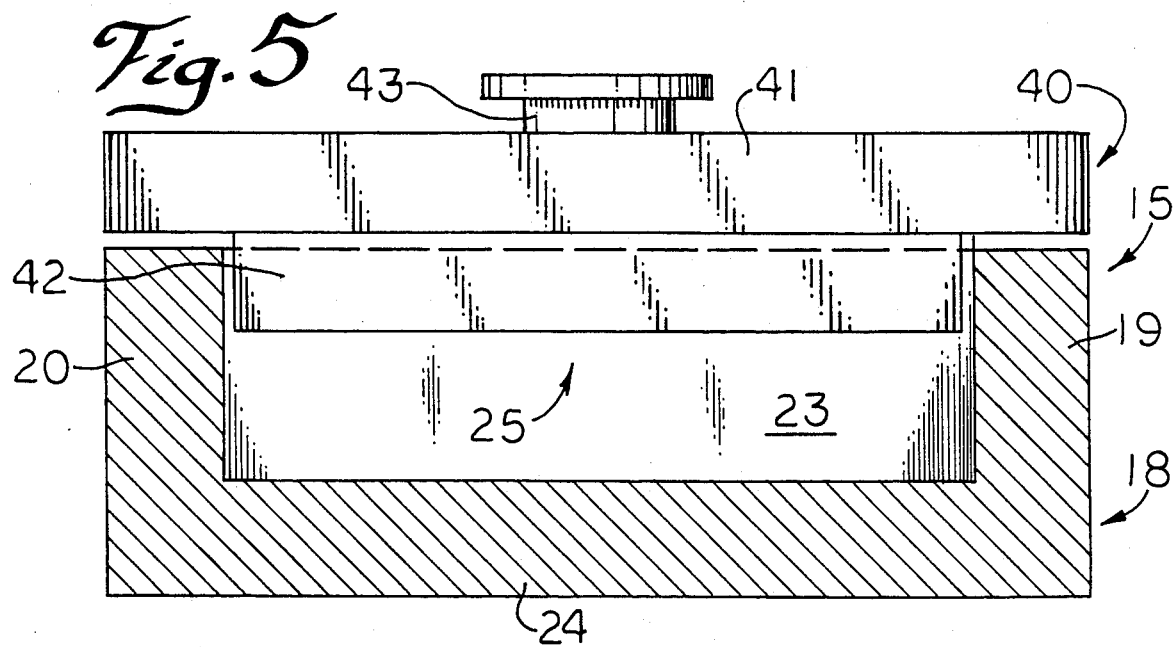

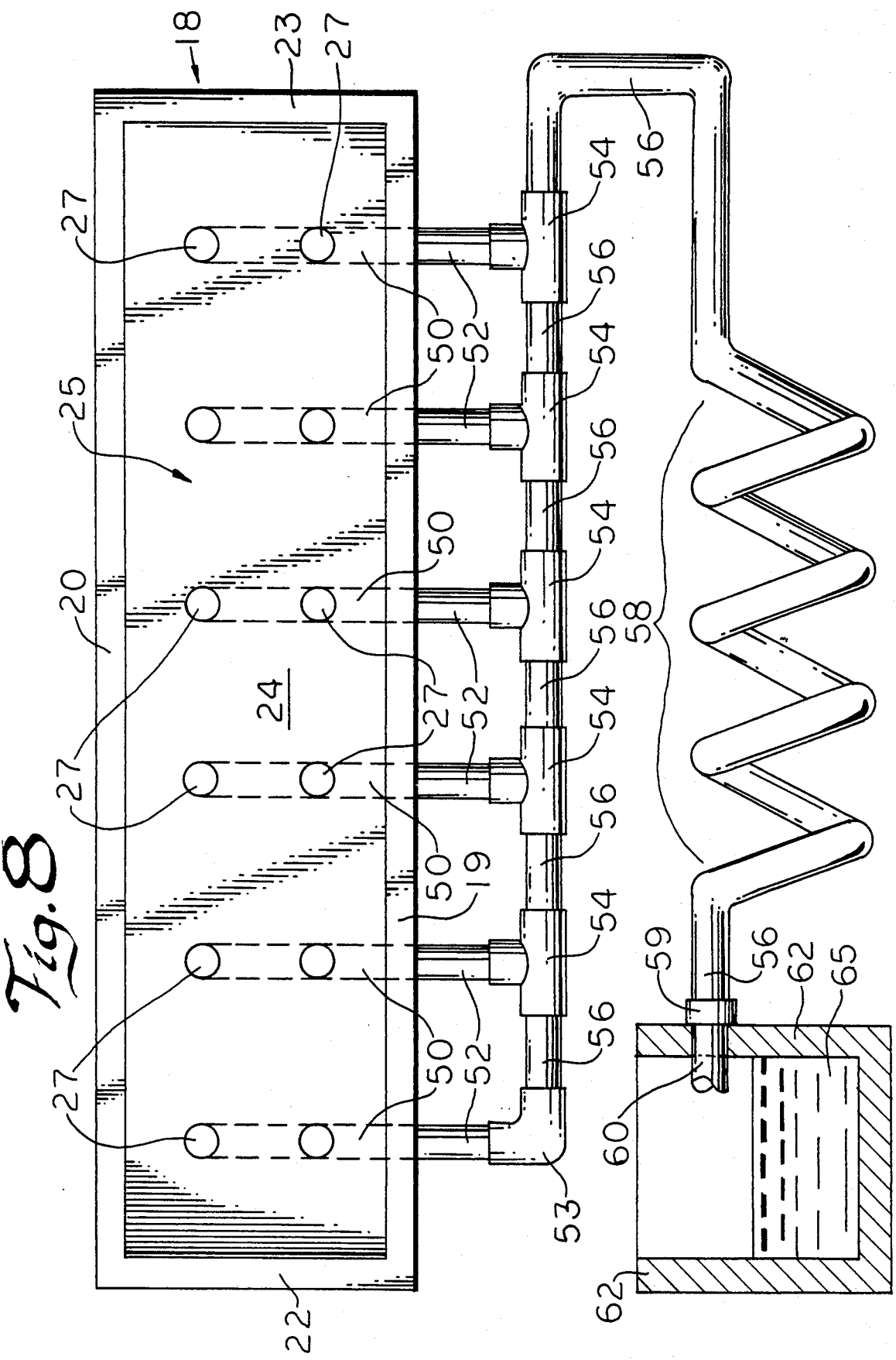

INTEGRALLY BONDED COMPOSITIONS OF CELLULOSICS AND PRODUCTS THEREOF DIRECTLY FROM WET SAWDUST AND THE LIKE

HISTORY OF THE APPLICATION

The present Application is a Continuation-In-Part of the copending and herewith-abandoned Application for U.S. Letters Patent of the present applicant entitled "Integrally Bonded Cellulosic Compositions and Products Directly from Wet Sawdust and the Like", having Ser. No.: 06/212,110, which was filed Dec. 2, 1980 which, in turn, was a continuation-in-part of the present applicant's earlier-filed and already-abandoned application for U.S. Letters Patent which was filed on Nov. 1, 1979 and was entitled "Integrally Bonded Wood Compositions and Products Directly from Wet Sawdust" having had Ser. No.: 06/090,829.

BACKGROUND OF THE INVENTION

There is a considerable and ever-increasing demand for "ersatz" or substitute wood-based products for utilization in place of the natural goods. This is particularly so in fields where particularly high strength and/or precisely-dimensioned, high quality-type goods are not involved. These, in other words, constitute relatively "rough"-type wood products and materials of construction.

Natural wood and lumber for such "rough" character applications (such as, aspen, poplar—or "popple", as it is sometimes called—, spruce, cottonwood, dogwood, jackpine, some maples and other relatively low-quality or low-grade stock) is becoming increasingly expensive, even though of a more-or-less "junk" wood reputation. Primarily for this reason of cost, it is getting less attractive and satisfactory for many applications and uses wherein it previously was entirely satisfactory from both performance and economics oriented points of view.

A good illustration of this are the separators used by brick manufacturers to maintain truck-lift openings in the brick cubes utilized for handling and storage. These at least historically were widely made of poplar slats of typical dimensions of about $\frac{1}{4}''\times 4$–$6''\times 28$–$32''$. Their cost, at one time, was quite reasonable. No great strength is required for these pieces; and precision tolerance is not a pre-requisite in their sizings. However, the ever-increasing price of such separator slats is encouraging relatively extensive investigation(s) for competitive artificial substitutes; especially those exhibiting the analogous apparent characteristics of the natural materials.

Other traditionally cheap-wood products and fabrications undergoing similar disenchanting experience(s) include: crates and cartons for various fruits and vegetables; large-scale separator or divider sections (as for sorted loadings of less than full capacity quantities of such things as different types of scrap metals, etc., in railway hopper cars, trucks, storage bins, etc.); pallets and palleting (or at least elements thereof); slats and strips for lathing and fencing; construction materials of rustic character; and so forth. For all practical intents, purposes and requirements, such "cheapwood" products seldom, if ever, need to have a tensile strength much, if at all, in excess of about 300 lbs./in$^2$ (ca. 16 kg/cm$^2$) or a compressive strength much, if at all, in excess of 240 lbs./in$^2$ (ca. 12.9 kg/cm$^2$). Of course, as is obvious, water-resistance in the product is highly desirable for many (especially outdoors) uses.

The use of sawdust as a filler for various binder substitutes seems, at least offhand, to constitute logical possibility for getting at and possibly circumventing the indicated problem. In fact, a fair amount of work has been done and activity expended along this line.

There are, however, at least two significant deleterious drawbacks involved in heretofore known attempts to produce wooden-like articles from sawdust, especially as the commodity has been perforce utilized in prior practice. These include the facts and circumstances that:

(1) The sawdust (or equivalent comminuted cellulosic)particles employed—which typically and usually, despite the fact that exceptions to and variances from the indicated normality, have and are of particulated dimensional characteristics which are on an average particle size reckoning that is ordinarily not much if any more than the No. 10 Size, advantageously less than the No. 12 Size, in the U.S. Sieve Series—must be dried prior to the previously-developed utilizations thereof so as to have an already-standardized and -established maximum moisture content that is between about 3 and about 15 weight percent (i.e., "wt. %"). Now then, "wet" sawdust and the bulk of its equivalent comminuted cellulosic natural plant or "vegetable" counterparts as from undried tree cuttings and other sources (depending on particular species taken and, to some extent, involved location and Season of the taking) has a natural moisture content of from about 40 to about 100 wt. %; a fair average for this being in the neighborhood of 60–70 wt. %. In this connection, the indicated wt. % ranges must be understood and accepted in accordance with the common terminology and definition applied in the trade for given moisture content in such materials. Accordingly and as regards at least "wet" sawdust, the 100 % moisture content level is one which, when equated to an absolute relative constituent parts by weight (i.e., "pbw")basis, means 100 parts of the sawdust and its associated contents as contained in the wood wherefrom it is obtained and 100 pbw water. In other words, the moisture content given is based on that percentage of water in the composition based on and compared to the content of the remaining non-aqueous content(s) of the wood (or the like) from which a given "wet" sawdust lot has been obtained. It is thus readily deducible that (by kiln-drying or the like oven-heating procedures), in order to prepare conventionally-suitable, Specification(s)-meeting, filler-grade sawdust, it is necessary to remove from the "wet" sawdust anywhere from about 97 wt. %, as a maximum, to 35 wt. %, as a minimum, of the original water content of the "wet" starting material to be converted into or incorporated in some sort of desired product. The heat energy required for such water ridding of and from the "wet" sawdust or the like is, quite obviously, enormous; with the expense of same, especially under current conditions and factors of cost for typically-employed fuels, tending to attach almost prohibitive aspects thereabout and thereto.

(2) Binding of dried sawdust and the like filler has only heretofore been with relatively expensive and more or less complex and technically-demanding binder systems, including plastic or resin binders. In illustration of this, reference may be had to the complicated and not uncostly nor uneasy technology involved for such purposes as is disclosed, inter alia, in U.S. Pat. Nos.:

1,642,846; 2,645,587; 2,851,730; 3,309,444; 3,391,038; 3,493,527; 3,554,941; 3,560,255; 3,649,442; 3,787,344; 3,790,401; 3,806,562; 3,956,541; and 4,165,409. As a basically-different curiosity (for present purposes) relating to lightweight brick of clay, sawdust and mortar, see the excerpt identified as "Fin-Times 12-7178, Page 11, CKAR" which appears at Page 12 of the "Technical Survey" for Dec. 23, 1978. Note also Page 1,548 of the "Rubber Handbook" (40th Ed.). A recent typical illustration of the state of the art involved in the binding into fabricated shaped articles of cellulosic materials is to be found in the March 1982 Issue of the International Harvester News (a house organ) which describes the use of dyed straw pressed together into decorative useful objects using resin for the cohesively-binding purpose. This occurs at Page 82 of that Publication which is formally entitled "THE FURROW".

(3) Further to the sort of art mentioned in the above Item (2), reference may be had to the rather comprehensive explanations of various particulated wood products to be found in the 3rd Edition (as well as in earlier compilations) of the famous Kirk-Othmer "Encyclopedia of Chemical Technology" published by John Wiley & Sons, Inc. of New York City. This authoritative source provides definitions of hardboard, particle board, "Masonite" (Reg. TM), insulating board, the so-called dry process board, composition board and so on and so forth; including good descriptions of the method(s) of their respective manufacture—all of which depend more or less on the inclusion and effect for binding of various synthetic resin adhesives, It is noteworthy to observe at Page 377 of Volume 22 of said 3rd Edition the expression as a generality that "wood is seldom used where resistance to chlorine and hypochlorite solution is required".

(4) Additional art of interest illustrating plainly contrsative and diverse techniques for the surface adhesion of and between veneers and/or equivalent layers of pre-formed and already-dried wood structures (whether of not prepared from particulated starting materials) may be found in U.S. Pat. Nos.: 4,007,312 and 4,183,997 which depend for the already-shaped article surface cohesion effect primarily on employment of certain catalysts and conduction of the procedure under generally non-alkaline (or, at least, not pronouncedly alkaline) conditions for the particularized laminating operation which is not adapted to bind together for fabrication into desired structural forms any comminutated and "wet" starting cellulosic materials.

(5) Other art, remotely involved, having no particular bearing on the binding of "wet" sawdust, per se, and/or its communited raw cellulosic likes and equivalents in undried or substantially undried condition and form (e.g., meaning that most if not all of the natural water in the "wet" sawdust, etc., particles being treated remains there at the beginning of the integrally-bonding fabricating procedure) includes U.S. Pat. Nos.: 2,187,016; 2,676,884, 3,536,578 (dealing, by way of particularization, with the addition of an oxidizing agent not reactive with starch to a paperboard material which is sized with starch); 3,859,108; 4,107,379; and 4,234,658 (the last-identified, for example, dealing with the bonding of sub-divided wood or bark wih an adhesive made up of ground-up foliage that has been treated with formaldehyde).

(6) Additionally, the prior art (besides requiring, as has been noted, use of dried sawdust or the like) has almost invariably aimed itself at the capability and desideration of providing: "super"-(as it were)-type goods having high-quality and literally impeccable characteristics as an essential; very good finish and tolerance potential(s); and high strength in the finished, fabricated sawdust and the like or at least analogous particles which are bonded together into composites (such, by way of repeated illustration, as the well-known and already-referred-to phenol-formaldehyde and/or urea-formaldehyde resin-bonded chip and/or particle board and similar manufactures that have gained widespread acceptability and usage in the market).

Despite all above-mentioned and additional which is utilized in and/or known to the art, the possibility of direct usage of "wet" sawdust and/or its likes or equivalents for answer(s) to and solution(s) of the indicated problems appears to have been inadequately addressed and not satisfactorily resolved. This seems to be the case notwithstanding the enigmatic fact that there is a literal superabundance of "wet" sawdust and the like or equivalent fibrous plant cellulosic materials in current available and largely non-utilized supply. In many locations, "wet" sawdust and/or its suitable alternatives can be had for no or little more than handling and/or shipping charges; being unfortunately (and distressingly to possessors thereof) in not great demand. Furthermore and of increasingly significant moment insofar as concerns "wet" sawdust and the like utilization or beneficial disposal or application, environmental restrictions in many locales now prevent burning for fuel purposes (especially on an industrial basis) of such materials.

And, along with these deficiencies, lacks and drawbacks, nothing in applicable prior art appears to realistically concern itself with nor suggest, teach, lead to or provide the instantly-contemplated, unique and estimable compositions and products derived and produced directly from "wet" sawdust or the like in the way so crucially direct and indigenously advantageous as in the present contribution to and advance in the art.

FIELD AND PURVIEW OF THE INVENTION

The present invention concerns itself with advantageous and novel compositions and shaped article products derived directly from and with "wet" sawdust which are readily and easily prepared, of good and reliable consistency, handled for use with attractive facility, dependable for performance in and for appropriate applications and workings thereof and therewith and generally quite worthwhile with regard to utility and adaptability for many things when measured against and in comparison with analogous heretofore-known sawdust-bonded or -filled compositions and articles.

The achievement and provision of all indicated are amongst the principle aims and objectives of the invention; with even more and additionally other benefits and advantages derivable in and from present practice and embodimental possibilities appearing and becoming more evident in the ensuing description and Specification.

SUMMARY OF THE INVENTION

The present invention, in its genesis and on the founding discovery on which it is based, broadly pertains to highly improved, advantageous and unprecedented, optimumly-prepared and very functional and pragmetic in essence and substance, integrally-bonded wood-like compositions and products prepared from "wet" sawdust and the like undried plant cellulosics (usually, as indicated, containing from 40–100, or so, wt. % water) into a shapable and workable composition without significant, if any, heat requirement for preparation of the preliminary, starting, integrally-bondable composition which is then fabricated into desired shaped article form frequently an oftentimes preferably using heat and pressure for the structure-making procedure (although, as mentioned, sometimes and quite advantageously without application of substantial, if any, amounts of heat and/or material or high pressure application) which composition has the potential to be and is in fact bonded and made cohesively-moldable and/or otherwise shapeable by readily-available and notably inexpensive resin-providing ingredients prepared from the non-costly carbohydrate raw materials (fundamentally the "wet" sawdust or the like goods but optionally, frequently with decided advantage, mixtures of same with other lower carbohydrates typified by common starch) which resin-providing ingredients generated in and from the carbohydrate(s) employed in undried form have the capability, more or less, of utilizing the water of the "wet" sawdust and/or its equivalent(s) due to inherently apparent, to greater or lesser extent, hydrophilic propensities or analogous behaviorism(s) that are at least quasi or pseudo in such nature if not strictly mechanistically so from a fundamental viewpoint; the involved reaction in which procedure and preparation can involve direct reaction(s) with the "wet" sawdust or the like and/or mixtures of same with lower carbohydrates, and so forth, all in primary and elementary pursuance with and as is set forth and delineated in the following, hereto-appended Claims hereof, all of which are here reitterated and incorporated by reference.

Suitable materials for utilization; as well as working porportional details, preparation conditions and operating and practicing techniques and parameters as well as other significant specifics and revelation details of the invention are also set forth and noted and emphasized in the following description and Specification.

COMPONENTIAL INGREDIENTS FOR THE INVENTION

As is evident in the foregoing, successful practice of the present invention is primarily and essentially dependent on the reaction between (or inter-reaction and/or inter-combination of) certain carbohydrate materials and substances and very strong oxygen- and/or chlorine-providing and/or -releasing agents. The action of these strong reagents on both wood and the like or equivalent higher molecular weight carbohydrates as well as (and sometimes with even more pronounced or at least noticeable effect) on the lower molecular weight carbohydrate forms (such as the starches and sugars) tends to literally open-up, tremendously degrade and break apart the carbohydrate ring structure(s) involved into literally innumerable chemical reactants, intermediates and bonding-agent sorts of derivative adhesive materials that tend to be or at least appear with such a functionality typically and at least somewhat (if not exceptionally as may come about and be observable) hydrophylic in nature. These, then, regardless of their inherent basic capability of utilizing and taking-up the water in "wet" sawdust (or its likes and/or equivalents) and to whatever extent such phenomenon actually occurs, in one or another (and oftentimes a combined) way possibilitate by inherent adhesion-promoting resin or constituent provision in the mass being handled the realization of manufacture of the above-mentioned sort of "rough", "ersatz" wood-like and -resembling compositions and products as well as many of such that are much better than crude quality in final form.

Now then, and as a well-known relative generality, carbohydrates (including the sugars) are amongst the most abundant constituents of plants and animals, in which they serve many useful functions. They are a source of energy and they form the supporting tissues of plants and some animals in the same way that proteins find utilization in and by the majority of animals. With considerable likelihood about it, they are the biological precursors of the other two important vegetable constituents, viz., proteins and fats. Their name is derived from the fact that many sugars have the empirical Formula: $C_nH_{2n}O_n$ or $C_n(H_2O)_n$. Hence, the French applied the name thereto of "hydrate de carbone" from whence comes the appellation carbohydrate; and that name has been retained even though it is not truly descriptive of the actual material and chemical nature of the substances.

Carbohydrates are systematically classified as: monosaccharides; di-, tri- and tetra-saccharides (oligosaccharides); and polysaccharides. Practically all the monosaccharides that occur in nature contain five or six carbon atoms. These, respectively, are known as pentoses and hexoses. They are colorless, crystalline substances possessed of a generally sweet taste. The disaccharides, which are condensation products of two hexose or pentose units, resemble the monosaccharides in taste, color and solubility. The polysaccharides are tasteless, amorphous, insoluble substances of the type Formula: $(C_6H_{10}O_5)_n \cdot H_2O$ or $(C_5H_8O_4) \cdot H_2O$*, in another formulation, wherein for all of which "n" is known to be large, oftentimes having a numerical value that is greatly in excess of 3,000. They are converted, on hydrolysis, to $C_6$- or $C_5$-characterizable sugars, as are the simple disaccharides. Cane sugar (sucrose) yields two $C_6$-type sugars, namely glucose and fructose, per the Equation:

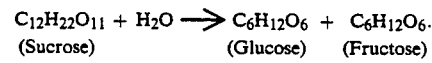

$$C_{12}H_{22}O_{11} + H_2O \longrightarrow C_6H_{12}O_6 + C_6H_{12}O_6.$$
(Sucrose)          (Glucose)    (Fructose)

*It is to be noted that frequently in written chemical structure formulae the symbolism "(——). H₂O" is oftentimes intended and taken to mean and represent crystal water in the molecule which is easily driven out or removed on drying. However, when such carbohydrate structures as $C_6H_{12}O_6$ are given the involved end groups in the molecule are obviously the —OH and —H radicals. Hence, in the given Formula, the (——)$_n$.H₂O structure refers to the —OH and —H end groups insofar as concerns the ".H₂O" inclusion therein.

In general, but with some exceptions, carbohydrate materials are essentially either of a water-soluble or water-insoluble nature (although the latter may be dispersible or suspendable in aqueous medium). Usually, such carbohydrates as starches, sugars and glucosides are water-soluble; notwithstanding that with starches they need not so be but are sometimes of a more truly-descriptive colloidally suspendable nature when put into water.

Typical simpler sugar types of carbohydrates include the following (in which structural depictions it must be taken into account, strictly speaking, that pyran is not a sugar but is a precursor with the classical basic ring formation for sugar(s) which is actually devoid of the ring-attached substituents typically found in the true sugar compositions):

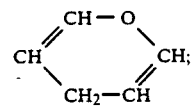

Pyran

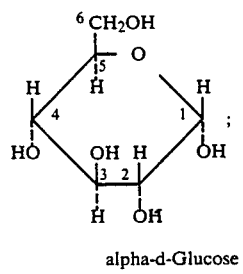

alpha-d-Glucose

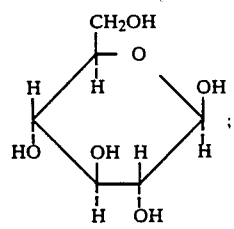

beta-d-Glucose

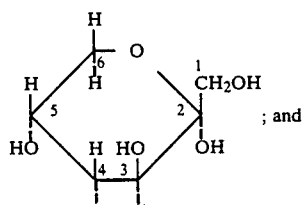

; and alpha-d-Fructose

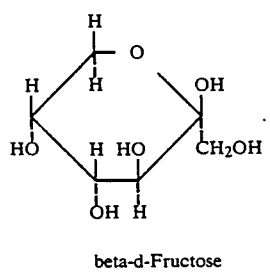

beta-d-Fructose

The synthetic methylglucosides resulting from the acid-catalyzed action of methanol on glucose exemplify a type of compound of abundant occurrence in plants. These are acetals (comparable to methylglucosides) and are derived from the combination of various hydroxy compounds with various sugars. They are designated specifically as glucosides, mannosides, galactosides, etc. The group, as a whole, is described by the generic name glycoside. When a sugar is combined with a nonsugar, the latter is described as an aglycone. When the second group is also a sugar unit, the combination is a di-, tri-, or polysaccharide. The glycosides are hydrolyzed by mineral acids to the sugar and the aglycone. For instance arbutin, a glycoside obtained from the bearberry (*Arbutus uva ursi*), yields glucose and hydroquinone on hydrolysis:

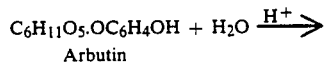

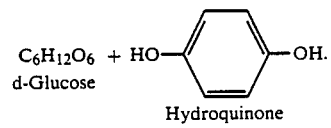

Glucose is the most common sugar component, but several interesting sugars occur only as glycosides.

Disaccharides can be regarded as glycosides in which the "aglycone" is a second monosaccharide unit. They resemble the monosaccharides in that they are very soluble in water and have a sweet taste. Only three occur as such in nature, sucrose (cane sugar), lactose (milk sugar), and maltose, and the latter is only occasionally found free. Disaccharides are encountered frequently as glycosides: gentiobiose from amygdalin is one example. Two disaccharides, maltose and cellobiose, are important because they are hydrolysis products of starch and cellulose, respectively. Since they can be obtained in high yield, they are evidently fundamental building units of these complex polysaccharides.

Sucrose on hydrolysis with acids or the enzyme invertase (plants, yeast, animals) yields d-glucose and d-fructose in equal amounts. The mixture of two hexoses is known as "invert" sugar because it is levorotatory whereas sucrose is dextrorotatory. Honey is largely invert sugar, i.e.:

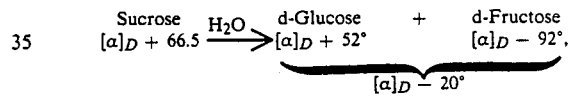

since bees contain invertase. Sucrose does not reduce Fehling's solution or form derivatives with phenylhydrazine, and hence the two sugar units are linked through the glycosidic hydroxyl group of each sugar and contain no free or potential carbonyl groups. Unlike the majority of sugars, sucrose crystallizes readily, probably because it does not undergo mutarotation in solution.

Polysaccharides belong to two general groups. These include, as mentioned, those that are insoluble and form the skeletal structure of plants and some animals; and those that constitute reserve sources of simple sugars (which are liberated as required by the action of enzymes present in the organism). Both types are high molecular weight polymers, often built up from a single pentose or hexose unit. In this respect they differ from the proteins, which are high molecular weight substances containing several repeated units (amino acids).

Cellulose is the most widely distributed skeletal polysaccharide. It constitutes approximately half of the cell-wall material of wood and other plant products. Wood cellulose always occurs in association with hemicelluloses of related structure and with lignin, a nonpolysaccharide. Lignin can be separated by treating wood with sodium bisulfite and sulfurous acid (sulfite process), or with caustic soda. Recently, anthraquinone pulping, in place of the sulfite process, is finding popularity. Plant celluloses, particularly those of woods, are not homogeneous. They can be separated into alpha-cellulose and beta-cellulose by treatment with caustic soda (i.e., NaOH), in which resultant treated mass the alpha-cellulose is insoluble and beta-cellulose is soluble.* Both are built from glucose units, and the difference probably lies in the degree and type of association.

* Yet, in another reaction of essential interest in practice of the present invention, the β-cellulose is, as compared to the α-version, better oxidized by such a reagent as NaClO; hence it is the more likely form to be oxidized by any other like or equivalent strong (or stronger) oxidizing reagent.

The isolation of cellobiose, cellotriose, and cellotetrose on hydrolysis of celluose shows that the glucose units are linked as in cellobiose, hence cellulose can be formulated as long-chain molecules. Under more vigorous conditions, cellulose is hydrolyzed to glucose. A representative cellulose structure is:

etc.; and naturally moist (i.e., undried or undehydrated) comminuted seeds from such various vegetables as melons, squashes, tomatoes, beans and other legumes; and so forth. Important for presently-contemplated reaction purposes and as has been indicated, "wet" sawdust and the like contain quite appreciable quantities in complex mixture of various starches, sugars (such as xylose, arabinose, galactose, etc.), glucosides and so forth. These, as will appear, are reactive with and affected by the strong oxidizing reagents utilized in practice of the invention. Even crushed corn residue from synthetic alcohol production may be beneficially utilized as either a "wet" cellulosic or a lower carbohydrate material, or both.

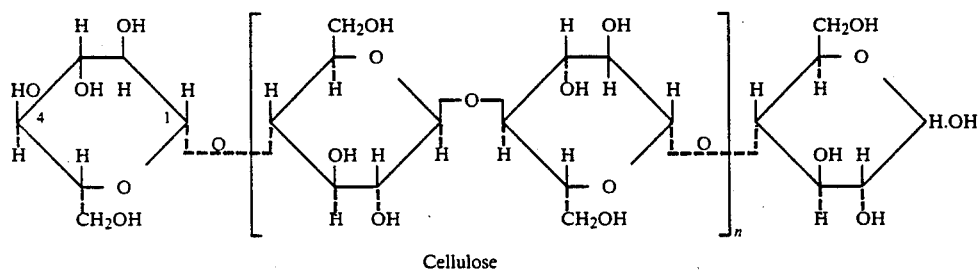

Cellulose

Actually, the highest yields of glucose are only 95% of the theoretical. This may be due to further degradation of glucose or to the presence of small amounts of other units built into the chain. Even carefully purified cellulose contains a small number of carboxyl groups, which (in the plant of cellulose derivation) are probably esterified. These may be formed by oxidation of the potential aldehydic group at one end of the chain, or of Intimately associated with the above-described wood cellulosic and like or equivalent materials is the fact that, of the several polysaccharides that occur in association with cellulose, two are pentosans. In other words and by way of explanation, they yield pentoses or hydrolysis. The more common one, xylan, is built from d-xylose units linked in the 1- and 4-positions, the structure of which is:

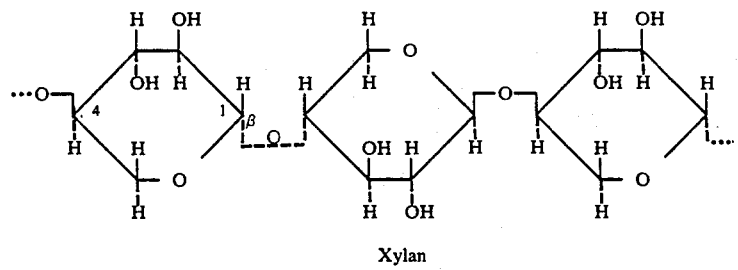

Xylan primary alcohol groups at $C_6$ to form a glucuronic acid derivative. Polyglucuronic acids have been isolated from straw and wood.

The remarkable mechanical strength and chemical stability are considered to be a result of micellar structure. Cellulose swells to some extent in water or dilute alkali, but since the crystal lattice is not destroyed, the reaction is said to be intermicellar. The lattice is destroyed whenever solution is effected.

Thus, "wet" sawdust is in essence the above-delineated type of basic cellulosic material with the mentioned high moisture content(s).

In this connection, useful equivalents and like "wet" cellulosic raw materials for utilization in practice of the present invention include undried (i.e., with substantial, if not complete, reservation of natural moisture content) particulated forms of: ground peanut shells or husks; corn cobs; sugar beet fiber; baqasse; walnut, pecan, filbert, Brazil and other nut shells; ground pits from such fruits as cherries, peaches, apricots, plums, olives, Xylan is closely related to polyglucoronic acid with which it is associated in nature and from which it may be produced by decarboxylation. Both are hemicelluloses, as found in wood amongst the polysaccharides associated with cellulose.

While it frequently is of considerable benefit and advantage for utilization in mixture(s) with the "wet" sawdust or the like starting material, the use of lower carbohydrate starch(es) and/or sugar(s) is not critical to satisfactory practice of the invention; being sometimes good to lower heat demands or lead to more quality in the output product made.

In its basic character, starch is the reserve carbohydrate in the majority of known and cultivated tree, vegetable and other plants. It is hydrolyzed by the enzyme diastase to maltose, or by mineral acids to glucose. Evidently, starch consists of chains composed of maltose units. Structurally, starch can be pictured as:

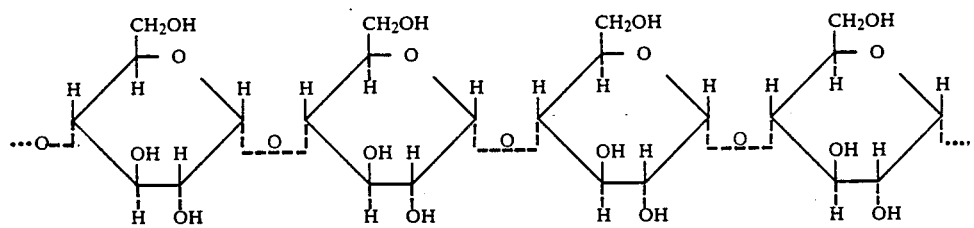

Starch Chain(s).

Starch can be separated into two fractions by treatment with hot water. These are: a soluble component known as amylose (10–20%); and an insoluble residue, amylopectin (80–90%). Both substances yield glucose or maltose on hydrolysis, but differ in several other respects.

Thus, amylose gives a blue color on treatment with iodine, while amylopectin yields a violet to red-violet color. Amylose is completely hydrolyzed by beta-amylase, while only about 60% of amylopectin is hydrolyzed.

The molecular weight of amylose ranges from 10,000–50,000 (osmotic pressure). The value derived by the end-group assay method agrees closely with that obtained by osmotic pressure. This shows that amylose contains only one end group per molecule and, hence, is a long-chain molecule structurally related to cellulose.

The molecular weights of amylopectin samples range from 50,000–1,000,000 (osmotic pressure). End-group assay indicates one end group for each 24–30 glucose units. Consequently, amylopectin must consist of branched chains. The compound 2,3,6-trimethylglucose has been isolated as the main product of hydrolysis of methylated amylopectin. In addition, hydrolysis yields small amounts of 2,3,4,6-tetramethylglucose (corresponding to the end groups) and of 2,3-dimethylglucose plus an isomeric dimethylglucose, possibly the 2,6-dimethyl derivative.

The isolation of 2,3-dimethylglucose shows that branching must occur at the 6-position, since the 1- and 4-positions are involved in the formation of the straight chain. Amylopectin has been pictured as a ramified molecule, in which the exterior branches are linked at the 6- and possibly the 3-position, per the following:

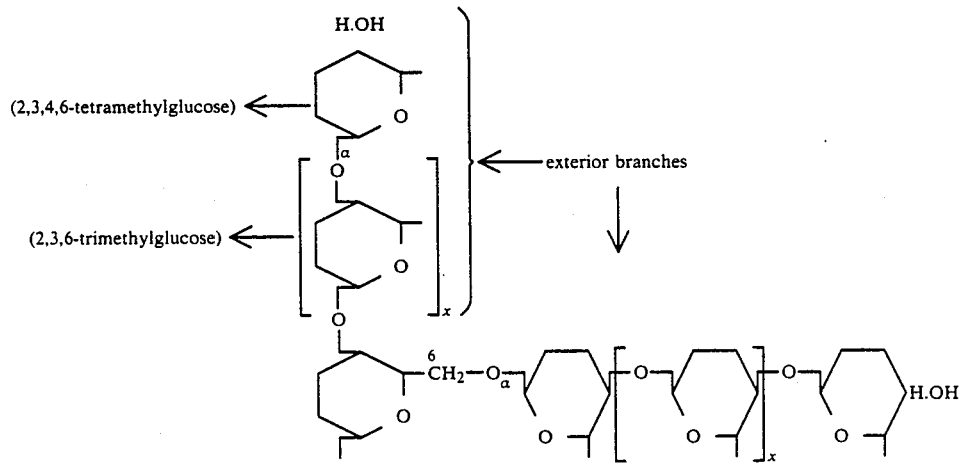

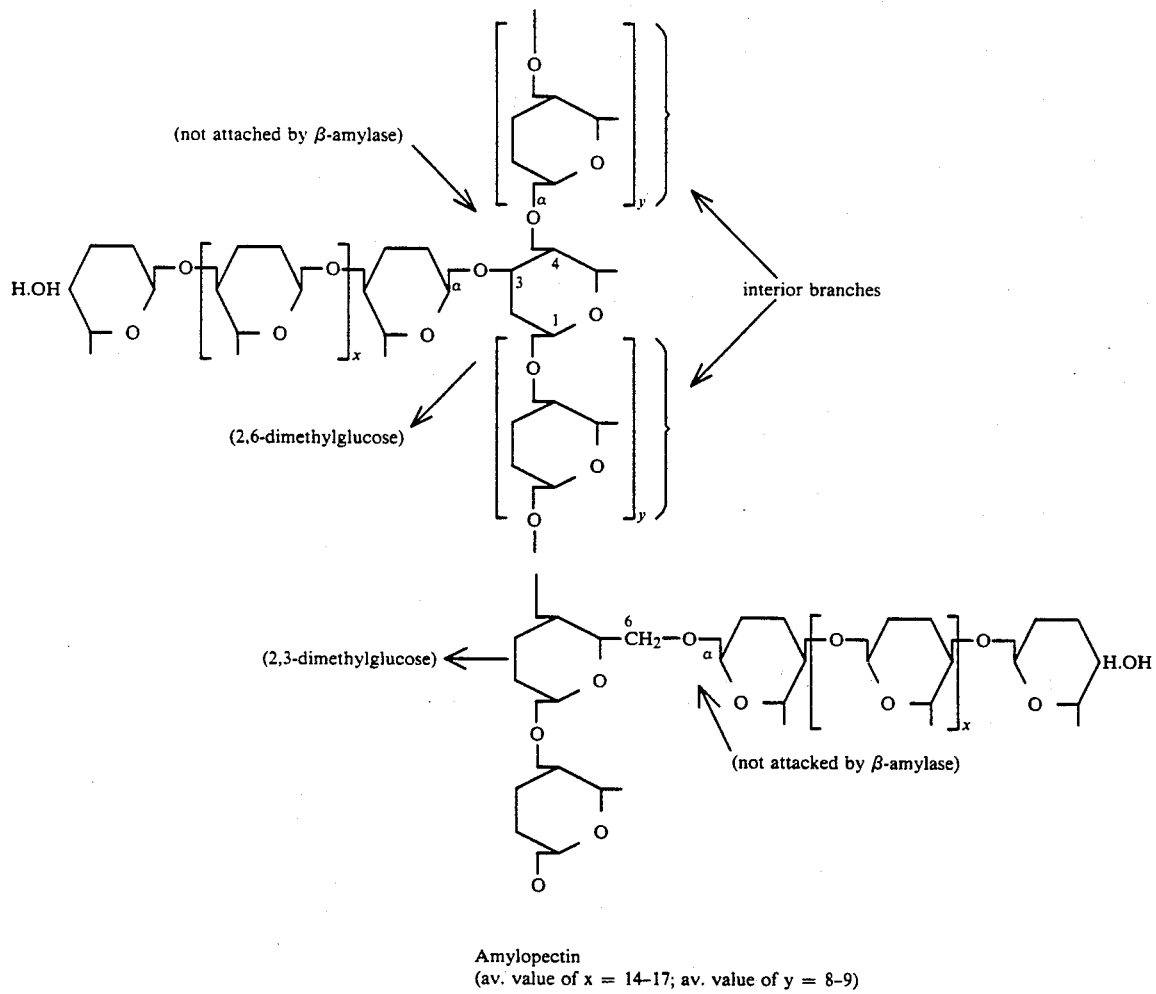

Amylopectin
(av. value of x = 14–17; av. value of y = 8–9)

Starch is not hydrolyzed completely by β-amylase because the linkage between the 1 α-position of one unit and the 3- or 6-position of another unit offers a point of obstruction to enzyme attack. The interior of the molecule, about 40% of the whole, is unaffected. This residue is known as grenzdextrin, which has a red to brown color when subjected to contact with iodine.

Wheat flour (as well as analogous flours from other cereal grains such as rye, oats and so forth); corn starch (and analogous starches from such grains as millet, maize and so forth) and soy protein flour are suitable lower carbohydrates for resin-producing degradation by and reaction with the oxidizing reagents employed in practice of the invention.

In this, there is a variation in content of nitrogenous and proteinaceous materials inherently contained in the various starches that may be utilized. These non-carbohydrate constituents are additionally helpful for supplemental chemical bonding purposes in the desired "wet" sawdust and the like binder provision so advantageously provided by the effect of and reaction with the strong oxidizing reagent employed. In general, soy protein flour is richest in such nitrogenous components, while wheat flour is leanest insofar as concerns its content of same. Corn starch and the like is intermediate between soy protein flour and wheat flour in its containment of nitrogenous constitutents.

The starch(es) and lower carbohydrates utilized (or at least some portions thereof) may even be from such (generally particulated) vegetable sources as undried potatoes (and/or potatoe peelings), corncobs, turnips, beets (very rich in sugars), bean, peas, peanuts, coconut and other nut husks, sunflower seeds, safflower seeds, flaxseeds, pumpkin and squash seeds, linseed meal and so forth. In fact, the usually unsaturated oleginous constituents in and with some of these carbohydrate supplies are often materially helpful in bolstering the resin-providing phenomena involved in practice of the present invention.

Of course, mixtures of flours and/or other suitable starches can be employed.

Likewise, the resin-providing materials may be obtained by reaction of the oxidizing reagents with sugars (such as sucrose). Sometimes, however, the reaction with saccharine carbohydrate derivatives is relatively more vigorous than desired (being, on occasion, even somewhat "explosive" in nature, the same even known to have been used as cheap, "home-made" dynamite).

Notwithstanding, it is oftentimes advantageous to utilize a mixture of sugar(s), such as sucrose, with the flour and/or starch as the basis of the lower carbohydrate employed for constitution of the resin-providing materials. While literally any proportion of sugar(s) can be used for such mixtures, it is usually advantageous for the mixture to contain only a minor proportion of the sugar ingredient. Along this line, the utilization in such starch/sugar mixtures of blackstrip molasses, in an amount on the order of up to 25 wt. %, advantageously between about 5 and 10-15 wt. %, quite beneficially enhances the resin-providing effectiveness of the flour and/or starch material involved. This range fits most sugar supplements, as it does the starch(es) when either are used alone or in admixture. The 49 wt. % minor proportion(s) of same can go as low as 0.1 wt. % or so in usage.

The strong oxygen- and/or chlorine-providing oxidizing reagent employed, as indicated, can be common household bleach (i.e., an aqueous solution of sodium hypochlorite —NaOCl—which is generally unstable out of water solution; having a maximum concentration in solution of about 17 wt. %). Bleach, even at normally-provided concentrations as low as 5 wt. % or so, reacts (with vigorous thermogenesis and exothermically) with most starches and sugars to give a very hydrophylic and complex material capable of bonding sawdust and utilizing, to satisfy its hydrophylic appetite, much (if not all) of the water in "wet" sawdust and the like or equivalent undried cellulosics. In fact, the sawdust and equivalent cellulosic, per se, wet in condition is also more-or-less susceptible (but positively so as is above explained) to the resin-providing reaction to the action of bleach or the like; this being an importantly basic manner of practice of the invention.

Other alkali metal hypochlorites, such as potassium hypochlorite (i.e., KOCl), is also utilizable, as are various other alkali metal and alkaline earth metal hypochlorites, (containing either or both of the—ClO and—$ClO_2$ radicals), chlorates (i.e., having the—$ClO_3$ radical therein) and perchlorates (i.e., having the—$ClO_4$ radical therein).

Bleach and may of its usable equivalents, however, do have the disadvantage of being necessarily utilized in aqueous solution; this tending to require greater quantities of the resin-providing flour and/or starch or sugar-modified fluor and/or starch ingredient. Accordingly, it is often more advantageous to utilize normally dry and solid hypochlorites and the like, such as "bleach powder" (i.e., $Ca(ClO)_2$ or $Ca(ClO)_2 \cdot 4H_2O$) or barium hypochlorite (i.e., $Ba(ClO)_2$).

Such materials as chlorine monoxide (i.e., $Cl_2O$), which is the anhydride of hypochlorous acid (i.e., HClO), may be employed to at least supplement the effectiveness of the above-mentioned reagents. In this connection, the addition of minor proportions of such material acids as hydrochloric acid (i.e., HCl) oftentimes is of material and marked assistance to help liberate chlorine from hypochlorites and the like, although the use thereof is totally optional and not material to basic satisfactory practice of the present invention.

Needless to mention, the addition of chlorine monoxide to water (in which it is highly soluble even at such low temperature levels as around 0° C.) makes for the direct formation of aqueous H-Cl-O, which is strong oxidizing reagent. Elemental chlorine itself dissolves rather well in water (one volume of water at 10° C. dissolving about 2.7 volumes of $Cl_2$ to give an 0.8 wt. % composition and, even at 20° C. dissolving about 2.3 volumes of $Cl_2$ for a 0.7 wt. % solution and, at 30° C., taking up about 1.8 volumes of $Cl_2$ to provide a 0.5 wt. % composition) to result in a good oxidizing material. Even the so-called chlorine water made from the reaction in aqueous media of potassium chlorate and hydrochloric acid (typically containing about 0.4 wt. % chlorine) gives another suitable strong oxidizing reagent.

Of course, suitable mixtures of elemental chlorine and oxygen can, if desired, be directly supplied to and provided in the reaction mass to effectuate the resin-providing product of reaction with the basic "wet" cellulosics, whether or not admixed with the indicated starch(es) and/or sugar(s)

Yet other sources for copious provision of nascent oxygen and chlorine can also be utilized in practice of the present invention. These include, for example, the commonly-employed materials that are available and used for such purposes as swimming pool water purification. Examples of such are the cyanuric acid and cyanuric acid derivatives of the type(s) represented by the Formulae:

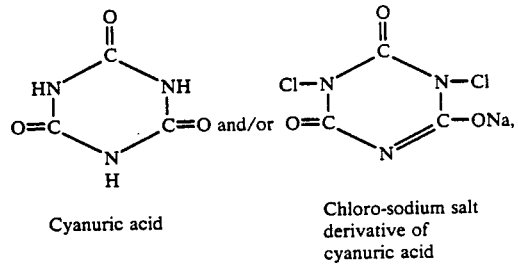

Cyanuric acid

Chloro-sodium salt derivative of cyanuric acid used individually or in combination with other of the strong oxidizing reagents possible to employ.

As is apparent, another important halogen, namely bromine, can be utilized in combination with or in full replacement of the chlorine moieties in any or all of the above-specified chlorine-containing entities, compositions and materials (including mixtures of elemental bromine with oxygen and suitable combinations in any desired proportion of elemental bromine and chlorine with oxygen) for achievement of the mentioned reaction(s) therewith upon and with the "wet" cellulosics used alone or with addition of other lower carbohydrates.

It is sometimes desirable and advantageous to incorporate other materials in the bonded "wet" sawdust and the like compositions and resulting products to be made and fabricated in accordance with practice of the present invention.

Of interest in this connection is the addition of phenol to the "wet" sawdust or like "wet" cellulosic mass/oxidizing reagent mixture (whether or not supplemental, lower carbohydrate starch(es) and/or sugar(s) are therein incorporated for facilitating utilization). This phenol inclusion provides for an ancillary resin-providing possibility, even if some heat and/or catalyst might therewith be required, of the "Bakelite" (Reg. TM) sort—which mentioned resin is the well-known thermoset product of phenol plus formaldehyde. Another variation on this is the addition of casein to have incorporated a "Galatite" (Reg. TM)-type bonding ingredient; the same being representative of the classic product of casein plus formaldehyde. Still another possible variation is to add elemental sulfur (S) to achieve something in the nature of a vulcanizing or cross-linking effect. As to this, the reaction mass needs to be heated about the melting point of S (ca., 120° C.) in order to facilitate reaction; the same applying to "Bakelite"-and/or "Galatite"-simulating preparations.

Although the addition of the indicated chemicals does add to the expense involved and is in relative militation against the desirability of avoiding usage of unnecessary and/or too much thermal heat input, the mentioned variations do sometimes enhance product quality and ordinarily involve only a minimum of extra heating for achievement of the desired supplemental benefit(s) without necessitating the driving out of too much (say, only 5-10 wt. %) of the water in the "wet" cellulosic in order to realize the desired extra advantage. The exothermic heat from the hypochlorite (or equivalent halogen-oxidizing constituent)/carbohydrate reaction, particularly when lower carbohydrates are included in the reaction mass, can also be a useful and propitious source of such supplemental thermal energy. When this is done, no more than about 5-10 wt. % of the phenol or casein, based on the weight of the cellulosic material being oxidized, should be utilized; this being especially the case when starch(es) and/or sugar(s) are included in the composition in which event the indicated percentage range of the phenol or casein additive can be reckoned directly only on the content of the lower carbohydrate constituent in the reaction mass.

Casein, of course, also serves as a thickening agent to assist water take-up in the "wet" sawdust or other "wet" cellulosic composition.

As will be evident to those skilled in the art, the utilization of a material merely for thickening agent effect and purposes cumulative to the integral-bonding action achieved in the preparation of compositions in practice of the present invention oftentimes requires a certain amount of "Edisonian-type" investigation to determine optimized results with use of such additives. In other words, several tests may have to be performed with given "wet" cellulosic compositions to determine maximum "water-binding" expectancy(ies) to be obtained with any particular thickening agent in question. Such factors as water content variations in the reaction mass and the equilibrium rates encountered in the action and performance of the involved thickening agent enter into this.

Nonetheless and analagous to the possibilities along the indicated line when casein is employed, other thickening agents may be incorporated for the preparations in practicing the invention (the same being generally employed in amounts not in excess of about 10 wt. %, advantageously from 1 to 5 wt. %, of the composition), if desired, in the compositions for added water absorption capabilities. These include such materials as algin, the various alginates, gelatin, methyl cellulose, carboxylated methyl cellulose and their likes and equivalents plus gum arabic, tragacanth and other natural gums and gum resins (above and beyond those naturally present in any given "wet" sawdust) such as aloes, ammoniacum, asafoetida, euphorbium, galbanum, gamboge, myrrh, olibanum, opopanax, sagepenum, scammony, etc. Worthwhile of note along this line is the fact that most starches themselves, especially if in superabundance in the composition, are quite capable of exerting pronounced thickening and stiffening propensities and effects in interaction with moisture associated therewith.

Another additive often useful to employ for water-absorption and structural strength-adding function is Portland cement or certain of its components, such as limestone (all very well and thoroughly described and defined in "The Chemistry of Portland Cement" by Robert Herman Bogue, published in 1947 by Reinhold Publishing Corporation of New York City). As is well known, Portland cement, in its "setting-up" reaction, is quite hydrophilic in nature. When utilized in practice of the present invention, it should be employed in minor amounts of, say, 1 to 5 or 10 wt. %, based on total composition weight.

A still further additive of frequently useful employment to imbue some modicum of water-proofing or water resistance to the products of the invention are latexes, such as the styrene/butadiene (which may be ordinary, vinyl- or acrylic-modified, carboxylated, etc.), acrylic and like or equivalent varieties added in minor proportion of the composition on an order of, say, not more than about 5 wt. % and, advantageously, between about 1 and about 2 wt. %. Low molecular weight waxes are also quite good along with or to replace a latex.

Almost needless to mention but, as desired, colorants and pigments in effective, conventional amounts can also be incorporated in the compositions to give specific fanciful and decorative effects to the products fabricated therefrom. Likewise, fire-retardant additives or self-extinguishing components (per current concepts and definitions for same as come about from and relate to "actual fire situations") as well as fungicides, anti-rot components and other desirable additaments may also be utilized, if and as desired. Metal powders and filings, and other ferrous and non-ferrous reinforcements (such as rods and wires) are also sometimes of beneficial utilization.

Of course, when bromine and/or a bromine-containing compound is/are employed as the strong oxidizing reagent that is used in practice of the invention, beneficial effects that are usually at least equivalent or analogous as obtained when many of the above-mentioned additives are employed may thereby be inherently achieved and realized. All of these things, as is evident and will occur to those skilled in the art, nicely enhance the improvement in certain results obtainable and provide for particular beneficiation(s) of the present compositions.

In further connection with the foregoing dissertation, the basic principles and limitations of: carbohydrates (including starches, sugars and cellulosics); "wet" sawdust; strong chlorine- and oxygen-providing oxidation reagents; cements; and other involved possible ingredients and components are so widely known and comprehended by those skilled in the art that, above and beyond what is here previously set forth, further fundamental expostulation of or elaboration on same is not herein made; the same being unnecessary for thorough understanding and recognition of the advance contributed by and with the instant development and the many benefits obtainable by practice and embodimentations in keeping with the present invention.

PARTICULARIZED DESCRIPTION FOR WORKING OF THE INVENTION

As is clearly evident and readily-enough apparent in (and not-difficult deducible from) the foregoing disclosure and description, practice of the present invention in basic essence and substance proceeds and involves implementation in the following way (keeping mention of ingredients and particulars, at this point, to purposely specific and not greatly generalized characterizations and descriptions):

(I) The fundamental concept of what is involved and what is to be produced in practice of the present invention rests on and is engendered from the fact (rather difficult to exactly precise) of the chemical reaction that, broadly speaking, goes as:

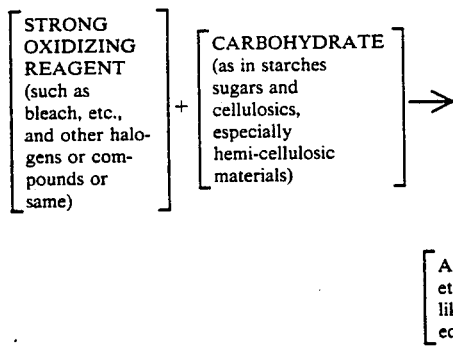

This, in practical implementation and effect, is the result of the actual burning (or other oxidation) of a carbohydrate (such as: the saccharine materials in sucrose, fructose, etc.; starches with their involved maltose units; and even wood in its cellulosic structure) in an oxygen-poor (i.e., insufficient air) atmosphere so as to yield the resultant formaldehyde and formaldehyde-type and -related materials. Of course and by way of actual characterization, formaldehyde, per se, is readily available in usually about 40 wt. % aqueous solution. This is in products oftentimes known as "Formalin". It is also available in a form, commonly known as "Paraform". In any event, it is of the structure:

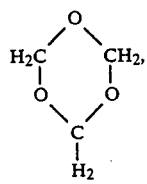

plus polymeric forms thereof.

The generalized reaction tends to go more readily with the water-soluble or partially-water-soluble carbohydrates (when these are utilized) since it can apparently proceed with greater facility in such more homogenous aqueous media. Notwithstanding, especially after the reaction has commenced when the starches and/or sugars are employed, there is a tendency for at least some of the cellulose in the "wet" sawdust reaction mass to enter into same despite the necessarily heterogeneous aspects involved in effectiveness of the oxidizing reagent(s) on cellulose, wherein more-or-less interfacial attack must proceed at the physical limits of the cellulose structure. Of course, the above-mentioned natural wood sugars and, to only a somewhat lesser extent, the hemicellulosic/polysaccharide constituents of the "wet" sawdust are, as is evident, relatively prone to participate in and undergo the indicated chemical transformation. Also and as has been explained, the reaction does proceed with "wet" cellulosics alone (even if at times some heating is need for at least its commencement).

(II) Without limitation thereto or absolute certainty thereabout, the more particularized chemistry (or at least the more pronouncedly susceptible chemical procedures) in the provision of the necessary bonding substance ingredients that are capable when properly adjusted according to and for content) of utilizing the moisture in "wet" sawdust and the like appear to be as set forth in the following equations:

(A) One, and typical, of the basic involved reactions:

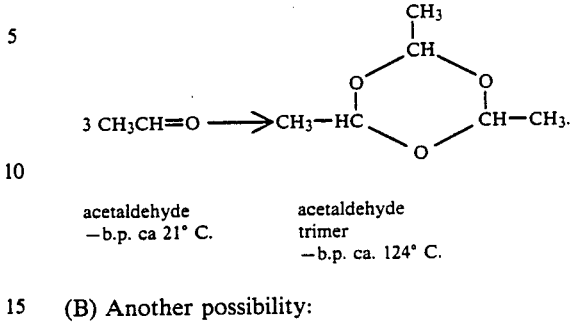

acetaldehyde —b.p. ca 21° C.   acetaldehyde trimer —b.p. ca. 124° C.

(B) Another possibility:

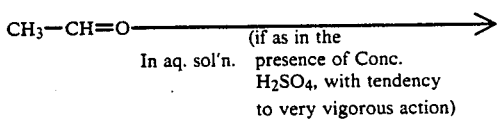

Yellowish/Red Aldehyde Resin.

In the above (and presumably): (x) the Aldol condensation reaction goes first, e.g.:

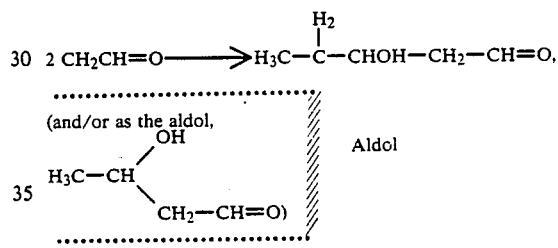

Or, (Y) - (or X and/or Y), with the above-formulated Aldol losing water to yield:

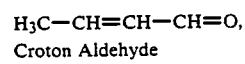

Croton Aldehyde

With, and next in the sequence, (Z); an acetaldehyde, such as

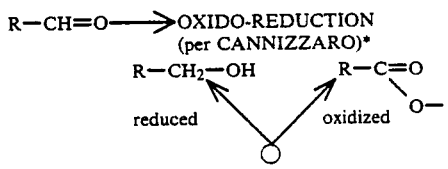

in which R is usually hydrogen or lower alkyl (i.e., containing up to about 6 carbon atoms), but can also be phenyl and/or cycloalkyl of from 6 to 10 carbon atoms.

(C) Firstly:

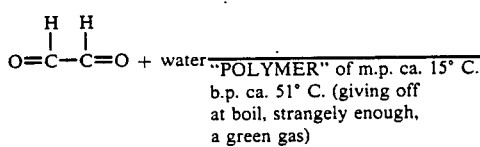

"POLYMER"

Then:

-continued

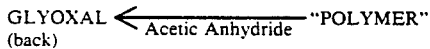
(back)

And then:

(CANNIZZARO)
(NOTE: Effect of an oxide-reduction within one molecule).
*FOOTNOTE: So named according to the discovery and teachings of the renowned and eminent Italian Chemist and Politician, Dottora, Dottora, Prof. Stanislao CANNIZZARO, whose principal work was "Sunto Di Un Corso Di Filisophia Chimica." (1880).

(D) Sugar (which, as has been noted, is present even without purposeful addition in wood as various saccharides, etc.), with the reaction of glucose possible as an aldehyde in some cases, due to such structural formations as:

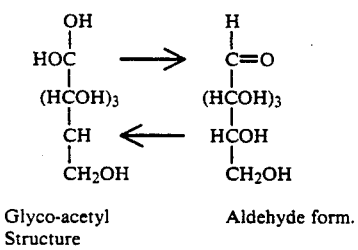

Glyco-acetyl          Aldehyde form.
Structure (III) The proportion of starch and/or sugar and/or starch/sugar combinations when such are added to the "wet" sawdust composition or mixture in order to help obtain the bonding constituent therefor varies, as is logical to expect, with all of the particular: lower carbohydrate constituent utilized; oxidation reagent (or combination of reagents) involved; and, of course and to some extent, the given "wet" sawdust material (including mixtures of various sawdusts and/or the above-disclosed likes and equivalents thereof) involved in handling and manufacture in accordance with the present invention. If desired, as much as 75 wt. % (i.e., 3 out of 4 parts by weight or "pbw") based on total composition weight, of such lower carbohydrate constituents may be utilized. Generally, however, quantities between about 5 and about 50 wt. % are adequate; with levels on the approximately 10-30 (i.e., from, say 8-22) wt. % oftentimes being quite suitable. When sugars or saccharine materials (such as sucrose, blackstrap molasses, etc.) are purposely added to and included in the lower carbohydrate component, lessened (down to as little as ½ wt. % or so) quantities thereof are generally found to provide very good and satisfactory results.

(IV) The effective proportion of the oxygen- and/or chlorine- and/or bromine-releasing strong oxidizing reagent (or mixtures thereof and including elemental chlorine and/or bromine and/or oxygen which may be employed individually, per se, or in satisfactory and operable combinations thereof or in beneficial incremental supplementation of other desired reagents) which are utilized for provision of the the at least partially water absorbing—or water-absorptive—and "wet" sawdust or equivalent(s) fibrous plant cellulosic bonding reaction product depends on: the particular nature of the involved reagent(s); as well as, to at least some relevant important extent (and in the instances when one is utilized) the character of the lower carbohydrate ingredient being reacted and also, to the noted and fundamentally very important extent, the given "wet" sawdust or equivalent undried fibrous plant cellulosic material involved. In general and as a rule of thumb maximum, it is unnecessary to employ more than one (1) mole of the reagent or reagent mixture for each individual polysaccharide and/or monocarbohydrate unit (such as the separate maltose units in starch or the glucose and fructose units in sucrose, etc.). In fact, such a quantity of the oxidizing reagent is ordinarily much more than that which is really required in order to effect the desired ring-splitting result to get the reactive, cross-linking-capable, hydrophylic (or however obtained) cellulosic (particularly "wet" sawdust")-bonding reaction product for function in practice of the invention. Thus, satisfactory results are often obtainable with amounts of the oxidizing reagent component that are as little as 0.001 mole, or so, per mole of the cellulosic carbohydrate and/or the starch and/or sugar material in any purposively utilized lower carbohydrate; this amount frequently being enough to bring about adequate ring-splitting and causation of the above-delineated basic chemical reactions believed to be and as is apparently evident involved in and as an integral part of conduction and carrying-out of the present invention. More often, a satisfactory mole ratio of strong oxidizing reagent to polysacchardie and/or starch and/or sugar moles involved may be as low as 0.01:1, and is usually very reliably workable when it is on the order of about 0.1–0.3:1.

(V) When a mineral acid, such as HCl (or hydrobromic, sulfuric, phosphoric and so forth, is utilized to assist chlorine (and/or bromine and/or oxygen) liberation from hypochlorites, hypobromites and the like or equivalent strong oxidizing reagents, it is added in very small proportionate quantities which are almost at a vanishing point level, such as those on the order of one (1) pbw of the acid to each 50 to 1,000 pbw(s) of the reagent.

(VI) Suitable proportions of other optional but oftentimes particularly helpful ingredients for inclusion in practice of the present invention (such as phenols, ureas, thickening agents, latexes, cement(s) and so forth) are as above disclosed in the foregoing Specification.

(VII) Illustration of an applicable composition in accordance with the invention is one that is made up with: 450,000 pbw of freshly-cut, approximately 60 wt. % water content (based on cellulose) and No. 12 Sieve Size poplar; 50,000 pbw of winter wheat flour (specifically one such as "MONTANA SAPPHIRE" Reg. TM Brand of same; and 18,000 pbw of "bleach powder". After thorough mixing and filling of the prepared composition into adequately-volumetric numbers of receptive flat-slab, low-compression molds of ⅞"×4"20" cavity size, the calculated reaction of the "wet" sawdust occurs. Within nine (9) days in the molds, nicely cohesive and rigid, utile slabs or slab-like products are obtained from each. When the same is repeated excepting to add 5,000 pbw of sucrose to the wheat flour ingredient, at least equally good results are obtained in somewhat shorter time. The same sort of pleasing and satisfying results are obtained when either or both of the foregoing recipes are repeated excepting to: (i) replace the "bleach powder" reagent with 36,000 pbw of 5% ordinary strength "household bleach" liquid reagent; (ii) and/or 13,000 pbw of the chlor-sodium salt of derivative of cyanuric acid; and (iii) to replace the sucrose with "blackstrap molasses" (such as the "BRER' RABBIT" (Reg. TM) or "HOUSE OF HERBS" (TM) Brands—or their commercial equivalents—of dark-grade quality of same) in like pbw quantity for the sugar constituent of the composition(s).

(VIII) In making up compositions(s), any sort of efficient mixing technique and/or apparatus may be employed. This includes even hand mixing in the old-fashioned way to make cement preparations in which a shovel and/or hoe is used for interblending of ingredients charged into a trough or shallow, open, tapered-wall tub. More efficiently, however (especially on larger scales), the mixing apparatus employed may be: a paddle or arm type with or without intermeshing fingers, blades or baffles; a horseshoe type mixer, with or without intermeshing elements; a rotating pan type with offset blades, including those known as the "pony" style; mixers with double motion paddles; kneading and masticating type mixers; pug mill types; soap crutcher types; ribbon mixer types, especially of the double helical variety; and so on and so forth. Although any addition sequence is suitable (including continuous increments), starch (if used) to sawdust then reagent is usual.

(IX) It is generally advantageous to form or fabricate the prepared "wet" sawdust composition as soon as possible after intimate admixture thereof has been achieved. Depending upon the particular shaped article desired to be made, any of a wide variety of shaping means and techniques may be employed for the fabrication. Generally, especially for large volume or merchant, rough-type wood replacement purposes, fabrication should be done by the most economic, suitable means possible for the purpose. This includes such ways of shaping materials as use of: very simple compression molds; basic extruders; calendar roll operations (especially when sheet- or slab-form products are wanted even if subsequent sizing needs to be done with the output); embossing or corrugating mills and the like (especially when honeycomb-style shaped article products are desired, such as egg carton form varieties; and so on and so forth. The fabrication at the earliest convenience possible after initial admixture (with, frequently, some curing or setting-up of the compositions also allowed) has been experienced is generally desirable. A setting-up delay often lets the composition being handled assume a more plastic and pliable or readily-shapeable condition as compared to its state in later stages of its bonding procedure and encounterment; particularly if the permitted curing is not allowed to go on for too long. However, somewhat relatively more-cured and comparatively clay- or putty-like, mastic and less gummose texture and character compositions are also capable of fabrication and ultimate shaping prior to final, hardened, set-up attainment of the mass. Much of the optimum fabrication procedure to observe depends on the equipment utilized for the purpose and the nature of the integrally-bondable composition being handled. It is of utmost economy and advantage to utilize as little as possible, if any, heat during or after fabrication to help set up and finally consolidate and bond the goods being made. This is more frequently experiencable when the compositions being fabricated contain some of the lower carbohydrate materials additional to the "wet" cellulosic component utilized. There are times, notwithstanding, when some heating is either helpful or mandatory; this being quite often the case when the integrally-bondable composition being fabricated is made to consist essentially of and from a "wet" cellulosic material and the oxidizing reagent therefor. Heating assistance is greatly desirable when a quicker cure or finally-resolved set is wanted. It is also useful, as is indicated in the foregoing Specification, when some particular additive or specialized extra ingredient for crosslinking or the like or other supplementing bebavior (such as in and for bond-supplementing purposes) above and beyond that normally obtained is included in the composition and necessarily requires the application of heat at an elevated temperature in order to achieve the wanted and additional beneficial effect. Nonetheless, the fabricated and/or shaped composition is handleable in most instances; even though it may require storage for reaction-completion and/or supplemental heating for total cure achievement purposes prior to utilization. Thus and by way of illustration of this, sheeted material from a calendar mill or roll output or log-simulating products from an extruder are often advantageously stored (this frequently being possible outdoors and with minimized, if any, protection) for period(s) of up to several weeks—or even months—to ensure maximum property development in the fabricated goods and articles produced.

(X) Especially when "wet" sawdust and its like or equivalent starting particular materials are utilized for preparation of the integrally-bondable compositions without inclusion of any other reaction- and/or bonding-promoting additaments thereto (including no usage of lower carbohydrate components) and the desired product is to be made by compression molding or calendaring procedures: it may be advantageous after initial preparation of the bondable composition obtained by the reaction of the cellulosic with the oxidizing agent (particularly when an aqueous one, such as bleach, is employed) to squeeze out at least some of the spent liquor from the reagent before subjecting the composition to compressive fabrication; and, during the actual shaping, to provide good drainage and collecting means for the remaining spent liquor from the reaction to be collected and saved for re-use (after refortification) or by-product recovery. In this connection, a typical "wet" sawdust operation yields a considerable quantity of spent liquor whether or not pre-squeezing is done due to the pressing out thereof from the composition of the liquid therein as a result of its compression for shaping and prior to its becoming an integrally-bonded mass. Extrusion operations also tend to give comparable spent liquor yields.

(XI) Spent liquor may advantageously be re-constituted for re-use by regenerating it with a fortifying source of the particular reagent employed for the oxidation reaction. For example, if common bleach is employed, the spend liquor therefrom may be regenerated by addition in appropriate aliquotes of strong bleach stock or by treatment with elemental chlorine. Refortified spent liquor is usually found to be an excellent reagent for further oxidizing reaction with the "wet" cellulosic and other carbohydrate material(s) in the integrally-bondable "wet" sawdust and like or equivalent compositions that are prepared for fabrication in practice of the present invention. This is because of the residuals therein contained from treatment and/or leaching of the "wet" cellulosic material by the oxidizing reagent employed then recovered as spent liquor. A refortified spent liquor re-used as an oxidizing reagent is frequently found to lend superior bonding characteristics to the "wet" cellulosic material therewith treated for the oxidizing reaction.

(XII) Spent liquor may also be employed to give a useful adhesive by-product. This may be procured from all of the spent liquor obtained in any given operation or from any portion of same which is excessive and/or not desired to be refortified. The adhesive by-product is simply obtained by straight forward drying or evaporation of the spent liquor supply available. The adhesive by-product thereby obtained is generally pulverulent in character and of a heat-settable nature (although it can also act as a glue with mere drying when employed in aqueous dispersion or other solvent suspension or solution). It is much in the nature and displays a very analogous behavior to the well-known animal glue compositions that have been used for many article-bonding purposes. When not made up into liquid or flowable compositions, the adhesive spent liquor by-product can be used dry to effectuate bonding by heat fusion thereof (this being done in the known manner).

(XIII) In addition to slabs, slats, boards and sheets, a wide variety of useful and desirable fabricated articles and products may be provided by practice of the present invention. These are additional to log and other substantially large cross-sectional shapes (which, incidentally, when cut into proper cordage lengths are capable of excellent utilization, amongst other evident applications, as firewood and/or for fireplace and furnace or boiler logs). In any event and for purposes of non-limiting illustration, such additional items include: blocks; plankings; shingles; battens (as, for example, those useful for the fruit and vegetable crate and box constructions); fence and telephone poles and posts; container separators; decorative trims and shapings; and so forth which are the like and/or equivalent of the mentioned items.

(XIV) Of particular interest and attraction is the very desirable incorporation of any or all of the aforementioned shapes, forms and so forth in further exceptionally utile composites such as, for example and by way of non-limiting illustration, in a three-ply laminate of the bonded "wet" sawdust and the like compositional fabrications pursuant to the invention as the internal constituent of such a construction. Such sort of structure may quite advantageously be frequently inforced by or, probably more importantly, surfaced and contained within face plies or skins of paper, paper board, cardboard, textiles, wood veneers (including even metal inserts and/or faces) whereby—to provide a fundamental but not restrictive illustration—novel plywood or equivalent forms and the like can be most efficaciously and economically. These types of sandwich structures are particularly attractive form many apparent uses.

(XV) Loosly-compacted layers of the fabricated "wet" sawdust and the like compositions (whether in unitary, laminated or sandwich panel constructional form) find good acceptability and wide applicability for insulating, acoustical, panel or dry-wall or even plaster backing purposes and other analogous utilizations wherein they need not be fabricated into structurally sufficiently-strong forms for fulfilment of independently supporting functions but provide other desirable and needed cooperative and associated utilities.

(XVI) Many of the shaped articles possible to prepare in practice of the present invention, including but even additional to those mentioned in the above Items (XIII) through (XV), may be made—and sometimes with considerable advantage thereabout—from starting "wet" cellulosic compositions in which only a portion thereof consists of a "wet" cellulosic material that has been treated with the oxidizing reagent. By way of illustration of this, the composition to be fabricated or shaped by any desired means may consist of 1 pbw of treat "wet" sawdust mixed with another pbw of the same (or even a different) untreated "wet" sawdust. In so doing, the residual oxidizing reagent liquor in the treated cellulosic also becomes effective on the untreated material contained in the mixture. Such practice tends to reduce the amount of spent liquor available from the composition being fabricated. While literally any proportion of an untreated "wet" cellulosic may be utilized in and for such starting composition mixtures (down to as little, based on total composition weight, as 1 or so wt. %), it is generally advantageous to keep the ratio of untreated-to-treated "wet" cellulosics in any such mixture in the respective 1:3 to 3:1 range; with a 50/50 or about equal mixture being oftentimes preferable. Excellent quality product is also obtainable by practice of such procedural variation with respect to raw materials utilization.

ILLUSTRATED EXEMPLIFICATION OF THE INVENTION

The invention is pictorially demonstrated in and by the eleven (11) views of the accompanying Drawing (most of which, for simplicity and convenience, are illustrated in a somewhat schematic and/or fanciful manner of representation with one of same being a flow-sheet type diagrammatical presentation and another of the views being a graphical, data-depicting portrayal and in the remainder of which, insofar as possible, the same Reference Numeral designations are utilized for like and/or similar parts) wherein, as they are to be taken in conjunction with the Specification and disclosure that follows:

FIG. 1 is a flow-sheet of procedures and results, with advantageous variations and alternatives also therein depicted, of manner(s) of practice beneficially possible in keeping with the present invention—being representative in this regard of more-or-less preferred forms of the invention which is herein described with adequate specificity thereabout—that demonstrates somewhat particularized ways in which the same may be accomplished;

FIG. 2 is a graphical depiction of test results obtained in the Second Illustration in the following working exemplification of the invention portion of this specification;

FIG. 3 is an exploded perspective view of a representative compression mold assembly suitable for molding "wet" sawdust and the like or equivalent "wet" cellulosic compositions into useful fabricated articles better made under the influence of heat and pressure in the practice of one sort of article-providing procedure that is oftentimes advantageous to follow in practice of the present invention.

FIG. 4 is a cross-sectional front elevation view, taken along the line 4—4 in FIG. 3, of the mold assembly shown in FIG. 3 but represented with the components thereof put together in operational respective emplacement;

FIG. 5 is a simplified, partly cross-sectional front elevation view of a suitable mold assembly showing one form of satisfactory cover or punch for the mold box which is a flanged-lid affair with a lower cavity-entering compression-effecting portion therein that is formed with or attached to the underside of the entire cover member;

Figure 6:
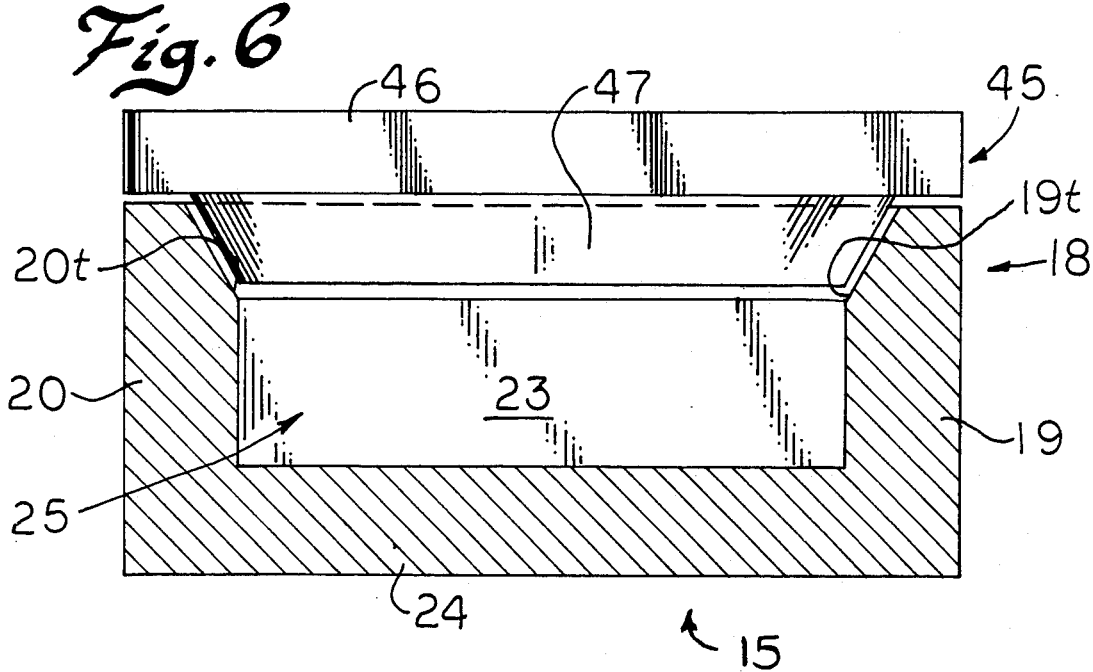
Figure 7:
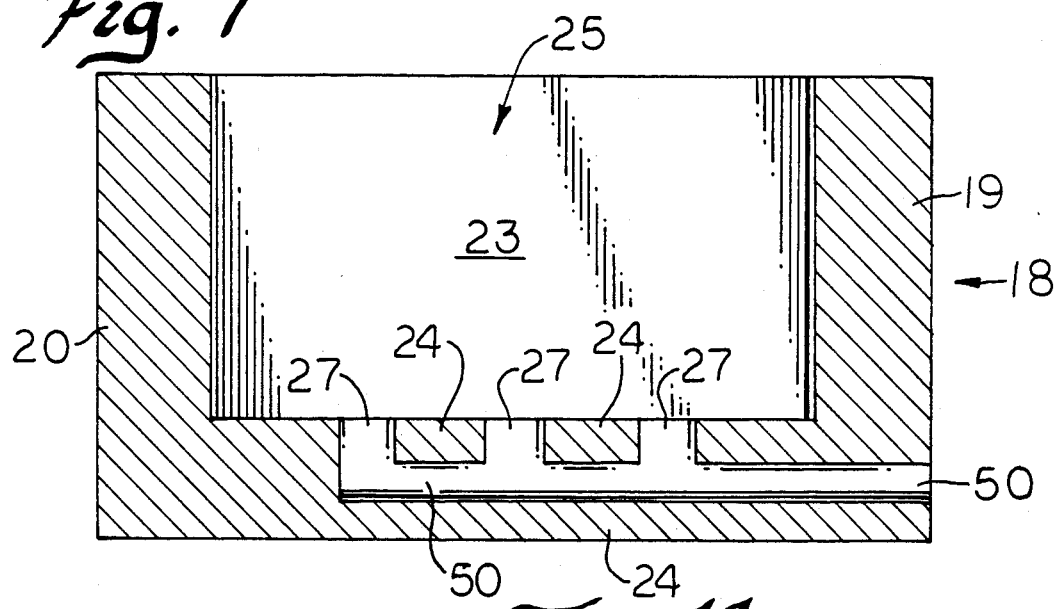
Figure 11:
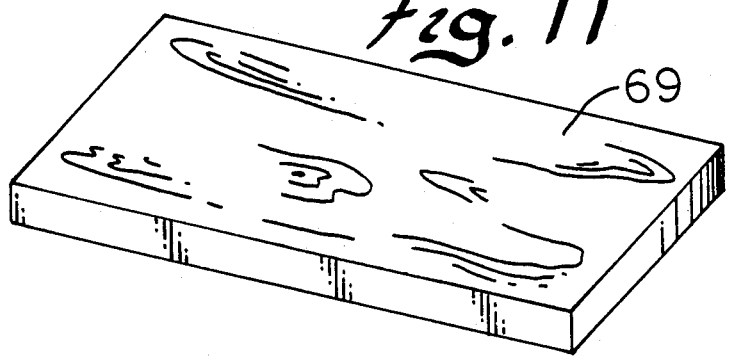

FIG. 6, also in simplified and partly cross-sectional viewing, shows another suitable mold assembly wherein the cover or punch member has tapered side walls with the corresponding interior front and side walls having an accommodating taper therein to delimit the compressive action of the mold on pressing insertion of the cover into the mold box cavity;

FIG. 7 is a simplified front elevation view in cross-section of a mold box having an incorporated liquid-collecting field arrangement in the bottom portion thereof to facilitate collection for regeneration or other re-use of spent liquor as it is being expressed from the treated "wet" cellulosic composition undergoing treatment during the mold compression action in fabrication of the composition into a desired shaped article;

FIG. 8 is a plan view, made in a somewhat fanciful manner of portrayal, of an open mold box of the type depicted in the above FIGS. 3-7 but with particular relationship to the fluid-collecting arrangement drawn out in FIG. 7 which more fully illustrates an entire spent liquor collecting installation from a mold having a fluid collecting field in the bottom portion thereof;

FIGS. 9 and 10 are respective, imaginative, cross-sectional front elevational views illustrating the compressive effect on a treated "wet" cellulosic mass in accordance with the present invention which also demonstrate the effect of the compacting or "press-down" ratio on the charged treated mass put into the mold for fabrication into a desired resulting shaped article product form; and FIG. 11 is a view in perspective of a typical and representative resultant shaped article product obtained after fabrication processing of a treated "wet" cellulosic mass pursuant to procedures and operations in accordance with the present invention.

The following supplemental explanations and disclosure(s) are set forth with reference to the several views brought forth in the above briefly-described drawing.

FIG. 1 nicely demonstrates the flexibility and multiple possible variability in operation of procedure and techniques practiced in accordance with the present invention. The context and showing discernable in the flow-sheet representation of FIG. 1 is in full keeping with what is herein and throughout thoroughly disclosed and revealed. Nonetheless, as is even more clearly apparent from introspection of FIG. 1, a variety of product goods can be readily and nicely obtained by selected following of the indicated routes therein demonstrated. For example, using essentially non-lower-carbohydrate-containing "wet" sawdust or like or equivalent "wet" cellulosic masses which are appropriately pressed during fabrication using beneficial heating assistance in the operation, a more-or-less hardboard sort of product (remarkably like "Masonite" in its characteristics and properties) may be obtained. This, for example, may be made in such popular sizes as the commonly-encountered 4 ft.×8 ft. panels having a nominal thickness of ¼ inch or so. If outdoor utilizations are envisaged, the composition to be fabricated may well be beneficiated by addition(s) thereto of a low molecular weight wax and/or a latex ingredient. Using appropriate molding or calendaring apparatus for the product formation, the output may be of the type (as is consistent with common trade designations) that is known as "S1S", meaning smooth on one side, or "S2S", means smooth on both sides. Such product usually has a density in the 0.7-1.0 grams per cubic centimeter (i.e., "gms./cm$^3$") range.

With slight alterations in the compacting pressure and heating requirements illustrated in the FIG. 1 flow-sheet, a comparatively cheaper and lower quality, roughly-natured, "ersatz" wood product may be obtained (imbued with either only indoor or indoor/outdoor durability characteristics) in any desired panel or structure dimensions, such as 4 ft.×8 ft. (or less) in typical thickness(es) of ¼ or ⅜ inch to ¾ to 1 inch in this dimension. Density of such a product may advantageously range from between about 0.5 and about 0.7 gms./cm$^3$.

With further apparent and already-explained alterations in the compacting pressure, heat input and apparatus utilization per the same illustration of FIG. 1, a type of thermal and/or acoustical insulation board (whether or not contained or to be contained in sandwich panel constructions) can be readily gotten in both regular or fire-resistant grades (depending on adroit reagent usage and/or additive selection for the purpose) in typical density ranges of from about 0.3 to about 0.5 lbs/ft$^3$.

The spent or waste liquor from many of the operations possible to conduct pursuant to the flow-sheet representation of FIG. 1 typically contains about 15 wt. % (based on total liquor weight) of solids—mostly lignin and sugars (actually, forms thereof that have been subjected to the oxidation) from the treated cellulosic material. This, in cases where its origin is from a bleach (i.e., aqueous NaOCl) treatment may readily be refortified by bubbling of elemental chlorine (with appropriate adjustment to maintained preferred alkalinity) therethrough to obtain, in desired strength, a very advantageously re-useable, re-constituted spent liquor broth reagent. This, as is indicated in FIG. 1, is merely recycled in the processing arrangement for treatment of untreated "wet" sawdust or the like. Alternatively and as is also indicated in FIG. 1, the spent liquor (or a portion thereof) may be converted to by-product adhesive material on evaporation and drying thereof.

FIG. 2, from its foregoing description, is evident and self-explanatory.

Going now to FIG. 3 of the Drawing, a compression mold unit or assembly is generally designated by reference numeral 15. It is comprised of a mold box or receptacle, generally designated by the reference numeral 18, which has: respective side walls 19 and 20; respective (albeit arbitrarily designated) front and rear walls 22 and 23; and a bottom wall or floor 24. The cavity within the enclosure of mold box 18 generally designated by reference numeral 25.

For escape of spent (or waste) treating liquor, if any, from the confines of the mold assembly 15 during compression for fabrication of the treated "wet" cellulosic composition being formed into a desired shaped article there are provided a plurality of drain holes or sewers 27 in the bottom 24 of the mold box. It is oftentimes of advantage for facilitation of release of the molded article to use (in the well-known manner of the art) a "knock-out" plate insert 29 in which liquid drain holes or vents 30 are suitably and effectively provided. Also, even though greases, waxes, silicone products and other mold release agents are commonly used pursuant to standard technique in any given molding operation pursuant to the invention, it is frequently beneficial to utilize either or both of bottom (33) and top (35) separator screens within which to charge the treated "wet"

cellulosic mass for fabrication in the mold. Such expendients often tend to greatly facilitate non-sticking and easier release of a fabricated molding from the mold assembly; especially in instances where no particular surface smoothness (be it of only the S1S style or, when required, an S2S type) is necessary in the finally-obtained shaped article being manufactured. The mold cover or punch 37, having vent holes therein for steam and/or vapor which are identified by reference numerals 39, completes mold asssembly 15. The cover 37, in standard fashion, is adapted to enclose the mold and compress therein for the desired fabrication the formable material charged therein.

Compression molds of the type illustrated in FIG. 3 of the Drawing are frequently mounted within hydraulic press (or other mechanically-compressing mechanism) arrangements which are not shown in the Drawing. The force of any such press should be adequately great to obtain the desired pounds per square inch (i.e., "psi") or other equivalent measure of compaction on the article being fabricted within the confines of the mold. Likewise, suitable heating means (not shown), such as steam, electrical resistance mountings or associations, hot air and so forth may also be beneficially utilized in the not-infrequent cases where thermal input into the mass being formed is either expedient or necessary.

FIG. 4, as is above indicated, merely clarifies the representation of a mold unit assembly 15 in associated working position insofar as concerns the included parts thereof.

In FIG. 5, the mold punch generally designated by reference numeral 40 is illustrated. This cover has a flanged lid part 41 with the depending, cavity-closing punch-press down portion 42 connected therewith. A handle (or equivalent) part 43 may be included in and for the flanged lid cover punch 40 (although, in actual practice and as is well known to those skilled in the art, much more sophisticated strapping, bolting and/or other connection arrangements are used to connect the mold box 18 and its cover punch 37, including the form 40 shown in FIG. 5 and the form 46 shown in FIG. 6) to an associated hydraulic ram or press or equivalent machine for imparting compressive force power for operation of the molding assembly 15.

FIG. 6 demonstrates a generally-designated tapered mold punch cover 45 having under its flanged lid top 46 the tapered-wall punch portion 47. The side walls 19 and 20 of the mold box 18 are correspondingly provided with respective upperly-tapered interior surface wall structures 19t and 20t. The front and back sides of the punch cover 46 may, if desired and frequently with advantage, also be similarly tapered; although this is not brought out in the showing of FIG. 6. A tapered punch cover arrangement often gives better sealing (without undesired and inadvertant charged mass expulsion) and more thorough and less wasteful compression effectiveness in a compression mold assembly.

In FIG. 7 (to be taken in close association with FIG. 8), drain field collecting lines 50 are shown as they may be installed in the bottom 24 of the mold box 18 for more efficient and direct collection of spent treating liquor being squeezed out of the mass of "wet" cellulosic material undergoing fabrication. Beneficially and as is more fully brought out in FIG. 8 of the Drawing, the drain field lines 50 which are in communication with the sink holes 27 in the bottom 24 of mold box 18 are interconnected with, for example, outlet tubes or conduits 52 which go into suitable fittings such as the end elbow 53 and the tee interconnections 54; all in turn passing into the primary mold box drain line 56. Since it is beneficial to condense the vapors oftentimes also generated and released in heated molding operations for more efficient recovery of spent treating liquor, a condenser coil (or like or equivalent cooling means) section 58 may advantageously be incorporated after its outlet from the mold box 18 in the drain line 56. Condenser coil 56 may be air, liquid or otherwise cooled to better ensure minimized or no wastage of spent or waste liquor being recovered. The drain line 56, from condensing section 58, can go through a fitting 59 which attaches it into the reservoir or container 62 for connection as a recovered supply of the waste or spent treating liquor 65. This, as desired, is then regenerated or coverted to by-product unless, for some good reason, it merely is discarded.

FIGS. 9 and 10, to be considered in close association, figuratively and schematically demonstrate in fanciful illustration the compressing effect during a molding operation of the treated "wet" cellulosic material being fabricated and some of the aspects of such formation. The "wet" sawdust or the like uncompacted mass in yet-remaining particulated form is identified by reference numberal 68 in FIG. 9 of the Drawing. This depicts how it would appear on initial charging to the mold to be fabricated in the shaped article form desired under the effects of pressure and, frequently most advantageous and/or necessary, applied heat. The "charge load" level in the mold assembly 15 prior to compressive action is designated by the symbol "CL" more closely associated with FIG. 9. After compressive action, the "push-down" level whereat the desired shaped article being fabricated assumes its final (at least approximatively if not exactly) dimension thickness is designated by symbol "PD" which is more closely associated with FIG. 10 of the drawing. The resulting shaped and fabricated article is designated by reference numeral 69 in FIG. 10 of the Drawing.

It is generally advantageous during compression molding operations for the ratio of "CL" to "PD" to be at least about 2:1, respectively. Of course, this depends to an almost entire extent on the density desired in the final product obtained which, as is apparent, is a function of the volume of the charged particulate mass 68 made to the mold box cavity 25 as compared to the volume of the final product 69 obtained. Also in this connection and literally needless to mention, wall heights of the mold box or receptacle 18 must be adequate to contain the entire charge made and the depth of the punch portion of the cover must be enough to ensure achievement of the desired "CL"/"PD" ratio. Such ratios may oftentimes beneficially be as high as 3–5, or more:1, respectively. Along this line, the actual volume of the charged mass of treated, particulate "wet" cellulosic material must obvviously be at least as great as that of the mold cavity 25 with the cover or punch in its lowermost position. This, as a minimum, provides a 1:1 "CL"/"PD" ratio. More often, however, the volume of the charged mass is at least twice and frequently as much as 3 or 4 up to 7 or greater time the volume of the mold cavity. Of course, if non-compressed, loosely-compacted articles are desired, the "CL"/"PD" ratio need not exceed much more than 1:1 and sometimes, for such products, may not even equal that (being then in the nature of the so-called "nonwoven" textile fabric constructions which, while integrally-bonded, have a very loose and low density construction having somewhat of a resemblance to a loosely-compacted pad or mat type of construction).

Of course, there are analogous considerations to take into account as to the (at least) equivalent of the "CL"/"PD" ratio when calendar mill or roll or extusion techiques are utilized for fabrication, as will be apparent to those skilled in the art. Likewise, the upper limit of such ratio may be as high as desired as is consistent with mechanical limitations, especially in instances where a super-dense product is wanted or required for some reason to be obtained. Usually, however, it is satisfactory for the "CL"/"PD" ratio to be such in maximum value as to not exceed the ordinary density values of natural wood. Along this line, the actual moisture content of the "wet" cellulosic material being fabricated has (as is readily discernable) a great deal to do with any optimum "CL"/"PD" ratio to employ for any given desired density product; since the amount of liquid to be squeezed out in the compressing step of any give fabrication has a naturally great bearing on this.

A shaped article product 69 that is in accordance with practice of the present invention is pictorially represented in the view of FIG. 11 of the drawing.

WORKING EXEMPLIFICATION OF THE INVENTION

The following illustrative Examples and demonstrations still further illustrate the invention. In these, all parts and percentages (unless otherwise indicated) are to be taken on the weight basis by which they were worked and (also unless otherwise indicated) all temperatures are in °C. For all the data produced and as a matter of greatest expedience for the testings done, the oxidizing reagent employed was ordinary bleach (i.e., the aqueous solution of NaOCl) used either in the household strength grade of about 5 or so % or in the commercial (so-called) "swimming pool" grade having a typical concentration of 10-15%. The stronger swimming pool bleach was generally diluted with water for utilization at a desired strength or for regeneration for re-use of spent treating liquor.

FIRST ILLUSTRATION

The following generalities, "rules of thumb", guidelines, advantageous conditions of and for working and other observations comes from a great deal of experimentation and investigation in actual reductions to practice of the invention. These, as will appear, are supportive of the revelations and disclosure set forth in the foregoing Specification.

(1) When sawdust is employed at the "wet" cellulosic starting material for practice of the invention, that from softwoods (including coniferous varieties of trees) is oftentimes advantageous in that more natural resinous materials are therein to be found which, in the course of the processing, tends to inherently supplement to some small degree the bonding effect obtained. On the other hand, sawdust from hardwoods frequently is found to provide rather good propertied and strong product often having better surface characteristics more or less akin to that commonly observable in such commercially available particle wood products as "Masonite". Sawdust from such States as Michigan tend largely to be from such woods as pine, spruce, birch and poplar amongst many other varieties there obtainable. Sawdust from States such as Ohio is largely of the hardwood variety from such trees as oak, maple and hickory.

(2) A good uniform fineness in the "wet" sawdust employed tends to provide superior results in the processing. In this and above and beyond the foregoing teachings as to suitable particle size, it has been found that sawdust containg chip pieces therein that have a length of about 1 cm and a width of from about 0.2 to about 0.1 cm. will work well; but too many inclusions much larger than that tends for undesirable handling and bonding problems in the material being worked.

(3) When using bleach of about 7% concentration, a good volumetric ratio for "wet" sawdust treatment is about 1 volume of relatively firmly-packed sawdust to ¾ volume of the bleach. This, of course, will be found to vary with the strength of the bleach employed and the nature of the sawdust being treated. And, in any event, optimum ratios of the oxidizing reagent to the "wet" sawdust for utilization are readily determinable for given situations by routine testing procedures.

(4) The container in which the "wet" sawdust is to be treated should have a capacity of about 4-5 or so times the volume of the liquid involved in the reaction. This ensures avoidance of spillage or undesirable overflow which might otherwise occur during the early stages of the treatment when a considerable amount of bubbling and boiling is generally encountered as a result of the reaction.

(5) Bleach concentrations of about 7% are ordinarily found to be quite satisfactory for most usages. Lower strength bleach compositions are operable, especially when a relatively warm ambient temperature is encountered or some heating is utilized. In such situations, 5-6% bleach is suitable. When the treatment is conducted in cold surroundings, bleach strengths of 8-9% are advisable. A 10% bleach composition generally causes a very rapid and "hot" treatment reaction. The spent liquor after treatment is generally salty and slightly alkaline in nature; and it has nowhere near the potential hazardous nature in use and as a result of contact as does the bleach.

(6) Excess spent liquor may be decanted or filtered off of the treated sawdust material. If drier treated sawdust is desired, pressure squeezing may be utilized to increase spent liquor removal. Sometimes a relatively drier treated sawdust avoids difficulties in handling excessive amounts of spent liquor during the fabrication operation, especially when substantially pressure is applied to the treated sawdust material being fomred into a desired shaped article.

(7) For many pressure molding (and equivalent) fabrication operations when heating is utilized to faciliate the shaped article formation, pressures on the order of between about 250 and 2,000 pounds per square inch (i.e., "psi"), advantageously from 500 to 1,000 psi, may be utilized with temperatures of from 100° to 180°, advantageously between about 145° and 165°, useful for acceleration of total product bonding. Under such conditions, a completely formed and fully-cured, bonded product can generally be obtained in molding cycles of from 10 or less minutes to an hour or so.

(8) Ordinarily, anywhere from between about 10% and about 60%, usually in the neighborhood of from 20% or so to about 40%, of the "wet" sawdust (or like or equivalent cellulosic) which has been bleach (or other oxidizing reagent) treated is found to have been made water-soluble in nature. The materials generated by the bleach reactions, of course, serve to bind the residue of the sawdust during fabrication operations with a good portion of the water-soluble fraction thereof (so rendered by reaction with the oxidizing reagent) being reverted in the article formation process to water-insoluble material, especially when heat is employed in the fabrication procedure (as when a heated mold, etc., is utilized for the purpose). The integrally-bonded products are commonly found to contain between about 5% and about 15%, more frequently on the order of 8 or so (like from 6 to 10) %, with the sawdust of the bleach or other oxidizing reagent.

SECOND ILLUSTRATION

A freshly-cut "wet" elm sawdust was employed as the starting cellulosic material. It was found to contain, on total "wet" sawdust weight, about 36% moisture and 64% solids (this, of course, having been in trade parlance a 56.25% moisture content sawdust material). The sawdust had an average particle size with greatest dimensions therein between about 0.1 and 0.2 cm.

To demonstrate the autocatalytic behavior of the "wet" sawdust/bleach reaction and to show the results of proper full treatment therein, a series of experiments were done wherein in each of which about 112 parts of the "wet" sawdust were treated with 1,000 parts of $5\frac{1}{4}$% bleach. Time temperature measurements were made in the course of each separate treatment, with the results thereof shown also in the graphical portrayal of FIG. 2 of the Drawing. The room temperature in which the experimentation was done was 20°; and no heating of reactant materials was done. The time/temperature data measurements obtained are as below indicated with, in each of the entire reported sequences, the time value is first indicated followed by the measurement recorded in the reaction mass at that time. It is interesting to note (based on moisture content in the "wet" sawdust and bleach strength), each of the treatments actually involved the reaction between 52.5 parts of NaClO and 72 parts of dry wood solids.

For Run "A" (which was abbreviated and stopped before temperature peaking in the course of the reaction), the time/temperature points were: 0/18°; 30/21°; 45/22°; and 50/22°.

For Run "B", the points were: 0/17°; 7/19°; 13/20°; C.; 18/21°; 21/22°; 31/23°; 37/24°; 50/24°; 61/25°; 72/35°; 74/37°; 77/42°; 78/49°; 85/62°; 90/59°; 100/57°; 109/53°; and 133/47°.

For Run "C", the points were: 0/8°; 6/11°; 14/13°; 22/15°; 34/16°; 34/16°; 60/18°; 75/18°; 85/18°; 97/19°; 105/19°; 108/19°; 115/19°; 128/19°; 129/20°; 132/21°; 135/22°; 140/27°; 146/31°; 155/43°; 156/43°; 157/43°; 158/51°; 159/53°; 161/53$\frac{1}{2}$°; 164/53°; 167/52°; and 187/48°.

The treated sawdust from Run "A" was gravity drained through a cloth filter; then dumped in 4,000 parts of water for a 5 minute rinse. After that, it was again drained, wrapped in a cotton cloth to keep the treated mass together, then heated under about 0.44 psi for 2 hours at about 135° (with pressure removal after the first hour). There was no adhesion whatsoever in the material upon which fabrication had been attempted. A portion of the treated mass which had been reserved from that first attempted to be formed was similarly heated under about 500 psi for 2 hours. Only slightly (albeit dissatisfactory) better results were obtained.

The material which underwent treatment in Run "B" (having an almost white, light bleached color in the first 22 minutes of the treatment and which floated and gave off gas bubbles around the temperature peaking only to sink and regain a somewhat brownish color at the end of the treatment) was drained, washed with 500 parts of water and then redrained. When made into a shaped, flat, disc-like mass and heated at 135° for two hours, a good product was obtained. Fabrication under 300 psi gave a very strong and fine quality product.

Similar good results were obtained with the molding in an analogous way of the treated product of Run "C".

THIRD ILLUSTRATION

A fresh red oak "wet" sawdust material was obtained. It was sieved through a $\frac{1}{4}$ inch mesh screen. Its solids content was 52% (based on total sawdust weight) so that it had, by trade definition, about a 92.4% moisture content.

About 1,000 gms. of the sawdust were treated with about 4,000 ml. of 5% bleach the stirring during the reaction. The time/temperature data recorded during the treatment were: 0/22°; 5/27° 7/32°; 9/40°; 12/49°; 14/59° (at which point strong gas bubble evolution was noted); 19/58°; 26/56°; and 50/50°. At 60 minutes, the treated material was filtered through a cloth.

The waste liquor after treatment was found to contain 12% solids. The treated sawdust, after filtration, was found to have a moisture content of 72.5%, based on the total weight of the treated composition.

Relatively weak, but useful, molded products were made by heating the treated sawdust for about an hour at 105–135°.

FOURTH ILLUSTRATION

About 1090 gms. of the treated red oak sawdust from the Third Illustration (which had a 27.5% solids content based on total composition weight) were taken for admixture with 150 gms. of a commercial dry corn starch which was the "ARGO" (Reg. TM) brand of same.

For the mixing, 1,000 gms. of water was added to the treated sawdust and 500 gms. of water to the corn starch, after which the respective water mixtures were blended to form a good slurry.

The thoroughly interblended slurry was first gravity filtered then squeezed, with a total of about 1,775 gms. of waste or spent liquor having been so recovered.

More than 500 grams of the treated sawdust/starch mixture was then put in a double platen press having open sides which was compressable by edge tightening of nut and bolt tighteners along the platen edges. The pressured material was heated for about an hour in an oven at 130°–140° C., after which time one of the platen sides was removed to facilitate evaporation with heating for an additional hour of the then no-longer-pressed material. The resulting product was a sheet which, after side trimming, had dimensions in inches of 11.7×26.7×1.9 with a volume of 593.5 cm$^3$ and a weight of 492 gms. Its density was thus about 0.83 gms/cm$^3$. It had very good mechanical properties and an excellent appearance.

FIFTH ILLUSTRATION

A series of experiments was conducted on a "wet" ash sawdust material to demonstrate, inter alia, some of the characterizable compositional features obtained in practice of the present invention.

The "wet" sawdust, which was screened to pass through a $\frac{1}{4}$ inch sieve, was obtained from an ash log having a thickness that varied from about 12 to about 16 inches and which had been felled for about 2 years (with outdoor rain, snow, sun, etc., exposure after that)

before being made into sawdust by cutting with an electrical chain saw. Its actual solids content was 74 wt. %, so that (again in the trade parlance) it had a 35% moisture content.

Treatment was made of the wet sawdust with 5% bleach in a ratio of 1 part of th sawdust to 3 parts of the bleach. Maximum temperature peaking during the reaction with the bleach reagent was 66° after 10 minutes. The treated sawdust was gravity filtered with some modest physical squeezing also employed in the separation.

The spent treatment liquor was found to contain about 12% solids, based on total liquor weight; while that of the "woody" treated solids was 31%, based on total treated sawdust weight.

The salt content of the involved water phase after the treatment (including that in the spent liquor) was determined to have been about 4.0% (NaCl). Thus, the spent liquor actually contained about 8.5% of soluble organic ingredients. Correspondingly, about 36% of the dry solids in the "wet"]ash sawdust that had been treated was determined to have been rendered water-soluble.

In contrast, the same untreated "wet" ash sawdust was leached for two hours in 3 times its weight of water at room temperature. After filtration, the leach water was evaporated and found to have a solids content residue of only about 0.1%—this plainly indicating that the water-extractables in the untreated "wet" sawdist were literally negligible.

The treated sawdust material was molded under heat and pressure into excellent quality flat specimens that resembled in both strength and quality commercial, conventionally-made hardboard product.

The spent treating liquor (having the indicated 8.5% organic solubles content in addition to about 4% NaCl therein dissolved was then used with additional "wet" ash sawdust to form a mixture which itself was moldable into acceptable quality product.

The ability to usefully employ the spent treating liquor for further "wet" sawdust bonding demonstrated that practice of the present invention possibilitates a literally "waste-free" process imbued with great versatility for application(s). By way of illustration, the spent liquor can itself be employed with the same "wet" cellulosic material from which it was derived to bind the "wet" cellulosic without oxidizing reagent treatment in order to provide a different grade and type of hardboard-like product from that made with the same treated "wet" sawdust. Alternatively, instead of separating the spent liquor after the bleach treatment, the oxidized mass can simply and directly be provided with additional untreated "wet" sawdust (in a proportion, say, of about 1 part of untreated material to each part of treated "wet" sawdust involved, although varied proportions may be uitilized) to permit preparation of a fabricated product made from the mixture of treated and untreated sawdust. This handling of spent liquor and permits production of roughly at least about twice as much of a common quality hardboard-like product in a single production step as when compared to procedures in which only a treated "wet" sawdust material is fabricated.

SIXTH ILLUSTRATION

A mold press was made having the features illustrated in FIGS. 3, 4, 6, 7 and 8 of the Drawing. It was designed to be capable of producing slats having dimensions (commensurate with those of the cavity when the punch was completely forced down) in inches of $\frac{1}{4} \times 4 \times 40$. By virtue of electrical resistance heating strips associated with the mold box and the cover punch, it could be readily heated for molding fabrication operations in the 140°—220° range. It was operated under (and with good connection to) a 200 ton hydraulic press, with the mold box fixed to the vertically movable platen of the press and the cover punch secured in alignment under the top plate in the unit.

The "wet" sawdust material employed was a typical mixture of sawmill product from the Northern Ohio Area, consisting of a mixture of about $\frac{2}{3}$ oak with the balance having been about equal proportions of hickory and maple. Its average particle size was on the order of between about one-eight and one-quarter of an inch (with some content of larger slivers and a very slight bit—less than $\frac{1}{4}$% of the total—of bark remnants therein).

A considerable number (at least 3 dozen) of treated "wet" sawdust lots were made from the indicated raw material. In the preparation of these, bleach strengths of from 5% to 10% were utilized, with more than half of same having been done with about a $7\frac{1}{2}$% assay bleach. About a third of the spent treatment liquor was reconstituted (with $12\frac{1}{2}$% swimming pool bleach) for re-use in the preparation of the treated "wet" sawdust lots that were made. Most of the treated "wet" sawdust material was gravity filtered to remove at least about half of the total treating liquid employed; while some of the treated lots were further pressed so that almost two-thirds of the liquid was removed as spent treating liquid. For some of the lots made with spent treating liquid, the same was added instead of or in combination with water to adjust the swimming pool bleach supply to the desired NaClO concentration.

In the pressing operation, the most common mold temperature utilized was an average of about 170°–180°. Cycle times for the pressings varied from about 20 minutes to an hour or so. In some of the moldings, the cavity screens were not employed. In each case, the mold cavity and punch bottom were coated with either mineral oil or silicone release agents. In about a third of the moldings performed (especially when larger charge ratios were utilized), the treated "wet sawdust to be fabricated was first made into a pre-form by encasing same in thin polyethylene film prior to charging of same to the mold for fabrication pressing. "CL"/"PD" ratios of from 1+:1 to 4:1 were utilized, with more than half of the molding runs made with that ratio on the order of form $1\frac{1}{4}$–2:1 to about 3:1.

For the most part, the mold slat-like products obtained were of at least fair strength with acceptable characteristics and quality thereabout. Density variations played a large part in this, with the fabricated articles made with greater "CL""PD" ratios ordinarily appearing to have come out better and stronger. A few of the samples made from the lots fabricated were damaged due to difficulty in getting good release thereof from the mold; even though the undamaged portions extracted were observed to be quite good and entirely acceptable in appearance and character. Three of the lots came out as inferior product due to use of excessively high mold temperatures (purposely done to approach 250° for the fabrication) which caused surface scorching and burning because of the thereby-incurred subjection to excessive heating for too long a period of time.

Many changes and modifications can be readily made in and adapted to embodiments and practices in accordance with the present invention without substantial departation from its apparent and intended spirit and scope, all in pursuance and accordance with the same as it is set forth and delineated in the hereto-appended Claims.

What is claimed is:

1. A fabrication composition comprising, in admixture:
   (a) a major proportion of an at least substantially undried, particulated, fibrous plant cellulosic material including, in particular, "wet" sawdust; plus
   (b) an effective quantity for reactive conversion and at least partial water-solubilization of at least a portion of said cellulosic material (a) of a strong, non-azotizing oxidizing reagent capable of destructive attack upon said cellulosic material, which oxidizing reagent is selected from the Group consisting of, nascent-oxidation-reactant forming chlorine-releasing, bromine-releasing, oxygen-releasing and -providing materials, chlorine, bromine and mixtures thereof.

2. A fabrication composition comprising, in admixture:
   (a) a major proportion of an at least substantially undried, particulated, fibrous plant cellulosic material including, in particular, "wet" sawdust;
   (b) a usually minor proportion of lower carbohydrate constituent selected from the Group consisting of starches, sugars and their mixtures; plus
   (c) an effective quantity for reactive conversion and at least partial water-solubilization of at least a portion of said cellulosic material (a) and for reactive transformation of at least a portion of said lower carbohydrate constituent (b) of a strong, non-azotizing oxidizing reagent capable of destructive attack upon both said cellulosic material (a) and said lower carbohydrate constituent (b), which oxidizing reagent is selected from the Group consisting of, nascent-oxidation-reactant-forming chlorine-releasing, bromine-releasing, oxygen-releasing and -providing materials, chlorine, bromine and mixtures thereof.

3. The composition of claim 1, wherein said cellulosic material (a) is a "wet" sawdust which has a natural moisture content, based on the weight of dry solid materials in said "wet" sawdust, that is between about 40 and about 100 per cent by weight (i.e., "wt. %").

4. The composition of claim 2, wherein
   said cellulosic material (a) is a "wet" sawdust which has a natural moisture content, based on the weight of dry solid materials in said "wet" sawdust, that is between about 40 and abouut 100 wt. %; and
   said usually minor proportion of lower carbohydrate consititunt (b) is in an amount that is between about 178 and about 75 wt. % of the total involved composition weight.

5. The composition of claim 3, wherein the effective quantity of said strong oxidizing reagent (c) is not in substantial excess of one mole of the reagent for each polysaccharide unit in said cellulosic material (a).

6. The composition of claim 4, wherein the effective quantity of said strong oxidizing reagent (c) is not in substantial excess of one mole of the reagent for each unit of both of the polysaccharide units in said cellulosic material (a) and monocarbohydrate units in said lower carbohydrate constituent (b).

7. A composition in accordance with that of claim 2, wherein said usually minor proportion of lower carbohydrate constituent (b) is in an amount that is not in substantial excess of about 49 wt. %.

8. A composition in accordance with that of claim 4, wherein said usually minor proportion of lower carbohydrate constituent (b) is in an amount that is not in substantial excess of about 49 wt. %.

9. A composition in accordance with that of claim 2, wherein said proportion of said lower carbohydrate constituent (b) is comprised of a mixture of a starch and a sugar with the sugar being present in an amount of up to about 25 wt. % of said mixture.

10. A composition in accordance with that of claim 4, wherein said proportion of said lower carbohydrate constituent (b) is comprised of a mixture of a starch and a sugar with the sugar being present in an amount of up to about 25 wt. % of said mixture.

11. A composition in accordance with that of claim 7, wherein said proportion of said lower carbohydrate constituent (b) is comprised of a mixture of a starch and a sugar with the sugar being present in an amount of up to about 25 wt. % of said mixture.

12. A composition in accordance with that of claim 8, wherein said proportion of said lower carbohydrate constituent (b) is comprised of a mixture of a starch and a sugar with the sugar being present in an amount of up to about 25 wt. % of said mixture.

13. A composition that is in accordance with any one of the composition of claims 1-6, wherein said cellulosic material (a) is a "wet" sawdust.

14. A composition that is in accordance with any one of the compositions of claims 7-12, wherein said lower carbohydrate constituent (b) is a wheat flour.

15. A composition that is in accordance with any one of the compositions of claims 7-12, wherein said lower carbohydrate constituent (b) is a corn starch.

16. A composition that is in accordance with any one of the compositions of claims 7-12, wherein said lower carbohydrate material is a soya protein flour.

17. A composition that is in accordance with any one of the compositions of claims 7-12, wherein any sugar in said lower carbohydrate material is sucrose.

18. A composition that is in accordance with any one of claims 1-6, wherein the effective quantity of said strong oxidizing reagent (c) is between about 0.001 and about 0.3 mole of the reagent for each individual unit present of either polysaccharide or monocarbohydrate, or both, in the composition.

19. A composition that is in accordance with any one of claims 1-6, wherein said strong oxidizing reagent (c) is an aqueous solution of sodium hypochlorite.

20. A composition that is in accordance with any one of claims 1-6, wherein said strong oxidizing reagent (c) is comprised of chlorine.

21. A composition that is in accordance with any one of claims 1-6, wherein said strong oxidizing reagent (c) is a calcium hypochlorite bleach powder.

22. A composition that is in accordance with any one of claims 1-6, wherein said strong oxidizing reagent (c) is a chlorosodium salt derivative of cyanuric acid.

23. A composition that is in accordance with any one of claims 1-6 and containing, in additional compositional admixture therein and combination therewith:
   (d) a measurable amount of up to about 10 wt. %, based on total composition weight, of Portland cement.

24. A composition that is in accordance with any one of claims 1-6 and containing, in additional compositional admixture therein and combination therewith:
(e) a measurable amount of up to about 5 wt. %, based on total composition weight, of a water-proofing additament selected from the Group consisting of latex(es), low molecular weight waxes and mixtures thereof.

25. A composition that is in accordance with any one of claims 1-6 and containing, in additional compositional admixture therein said combination therewith:
(f) a measurable amount of up to about 10 wt. %, based on total composition weight, of a casein.

26. A composition that is in accordance with any one of claims 1-6 and containing, in additional compositional admixture therein said combination therewith:
(g) a cross-linking quantity of elemental sulfur.

27. A composition that is in accordance with any one of claims 1-6 and containing, in additional compositional admixture therein said combination therewith:
(h) a measurable amount of up to about 10 wt. %, based on total composition weight, of a thickening agent selected from the Group consisting of algin, alginates, gelatin, methyl cellulose, natural gums, gum resins and mixtures thereof.

28. A composition that is in accordance with any one of claims 1-6 and containing, in additional compositional admixture therein and combination therewith:
(i) about 1 part by weight of a mineral acid per each 50-1,000 parts by weight of said strong oxidizing reagent (c) in the composition.

29. The composition of claim 28, wherein said mineral acid is hydrochloric acid.

30. A composition that is in accordance with any one of claims 2, 4 or 6, wherein at least a portion of said lower carbohydrate constituent (b) is provided by the residual and natural lower carbohydrate content of said fibrous plant cellulosic material (a).

31. A composition that is in accordance with any one of claims 1-6 and which is further characterizable in having between about 10 and about 60 wt. % of said fibrous plant cellulosic material (a) rendered more or less water-soluble by the action thereon of said strong oxidizing reagent (c).

32. The composition of claim 31, wherein between about 20 and about 40 wt. % of said fibrous plant cellulosic material (a) is in water-solubilized form.

33. A composition that is in accordance with any one of claims 1-6 and which is further characterizable in containing and having available for integral-bonding purposes an amount that is between about 5 and about 15 wt. %, based on composition weight, of binding material that has been generated by the action of said strong oxidizing reagent (c) on either said fibrous plant cellulosic material (a) or said lower carbohydrate constituent (b), or both.

34. The composition of claim 33, wherein between about 6 and about 10 wt. % of said internally-generated binding material is present in the composition.

35. A fabricated shaped and integrally-bonded article of manufacture that has been prepared by subjection to bonding conditions of any one of the compositions in accordance with claims 1-12.

36. A fabricated shaped and integrally-bonded article of manufacture that has been prepared by subjection to bonding conditions of a composition that is in accordance with that of claim 13.

37. A fabricated shaped and integrally-bonded article of manufacture that has been prepared by subjection to bonding conditions of a composition that is in accordance with that of claim 14.

38. A fabricated shaped and integrally-bonded article of manufacture that has been prepared by subjection to bonding conditions of a composition that is in accordance with that of claim 15.

39. A fabricated shaped and integrally-bonded article of manufacture that has been prepared by subjection to bonding conditions of a composition that is in accordance with that of claim 16.

40. A fabricated shaped and integrally-bonded article of manufacture that has been prepared by subjection to bonding conditions of a composition that is in accordance with that of claim 20.

41. A fabricated shaped and integrally-bonded article of manufacture that has been prepared by subjection to bonding conditions of a composition that is in accordance with that of claim 23.

42. A fabricated shaped and integrally-bonded article of manufacture that has been prepared by subjection to bonding conditions of a composition that is in accordance with that of claim 24.

43. As an article of manufacture in accordance with that of claim 35, wherein said integrally-bonded cellulosic fabrication is embodied as a composite fabricated structure with another distinct solid material of construction.

44. As an article of manufacture in accordance with claim 36, wherein said integrally-bonded cellulosic fabrication is embodied as a composite fabricated structure with another distinct solid material of construction.

45. The article of claim 43 having, in a plywood-style of construction, a central integrally-bonded cellulosic fabrication faced on at least one major exterior side with a veneer skin.

46. An article in accordance with that of claim 45, wherein said cellulosic fabrication is from a "wet" sawdust that has been treated with a strong oxidizing reagent and said veneer skin is wood.

47. The article of claim 44 having, in a plywood-style of construction, a central integrally-bonded cellulosic fabrication faced on at least one major exterior side with a veneer skin.

48. An article in accordance with that of claim 47, wherein said cellulosic fabrication is from a "wet" sawdust that has been treated with a strong oxidizing reagent and said veneer skin is wood.

49. Procedure for making a wood-resembling, fabricated article of manufacture which comprises the Steps of:
(I) treating in intimate and thorough leaching admixture capable of individual particle wetting
(a) a mass of an at lest substantially undried, particulated, fibrous plant cellulosic material including "wet" sawdust with
(c) a quantity of a strong, non-azotizing oxidizing reagent that is in an amount sufficient to react with at least a portion of said cellulosic material (a) and which reagent is selected from the Group consisting of, nascent-oxidation-reactant-forming chlorine-releasing, bromine-releasing, oxygen-releasing and -providing materials, chlorine, bromine and mixtures thereof;
(II) continuing said treatment of said cellulosic material (a) with said reagent (c) until at least partial water-solubilization of said cellulosic material (a) is achieved; then (III) physically forming said treated mass of the cellulosic material (a) into a desired finished article shape; and finally (IV) curing said finished article shape into an integrally-bonded, cohesive, completed and manufactured structure.

50. Procedure for making a wood-resembling, fabricated article of manufacture which comprises the Steps of:

(I) treating in intimate and thorough leaching admixture capable of individual particle wetting a mixture of (a) a mass of an at least substantially undried, particulated, fibrous plant cellulosic material including "wet" sawdust and an included proportion of up to about 75 weight percent (i.e., wt. %), based on total weight of said mixture, of (b) another combined mass of a lower carbohydrate constituent selected from the Group consisting of starches, sugars and their mixtures; with, for the treatment of said mixture (c) a quantity of a strong, non-azotizing oxidizing reagent that is in an amount sufficient to react with at least a portion of said cellulosic material (a) and at least a portion of said lower carbohydrate constituent (b) and which reagent is selected from the Group consisting of, nascent-oxidation-reatant-forming chlorine-releasing, bromine-releasing, oxygen-releasing and -providing materials, chlorine, bromine and mixtures thereof;

(II) continuing said treatment of said mixture with said reagent (c) until at least partial water-solubilization of said cellulosic material (a) and at least partial reaction of said lower carbohydrate constituent (b) is achieved; then (III) physically forming said treated mixture mass of the said cellulosic material (a) and the said lower carbohydrate consituent (b) into a desired finished article shape; and finally (IV) curing said finished article shape into an integrally-bonded, cohesive, completed and manufactured structure.

51. The procedure of claim 49, when and wherein said cellulosic material (a) is "wet" sawdust.

52. The procedure of claim 50, when and wherein said cellulosic material (a) is "wet" sawdust.

53. The procedure of claim 50, when and wherein said combined mass of said lower carbohydrate consituent (b) is an included proportion of between about ½ and about 49 wt. %, based on total mixture weight of the involved cellulosic material (a) and lower carbohydrate constituent (b).

54. Using a "wet" sawdust as the mass of cellulosic material (a) in practice of the procedure of claim 53.

55. The procedure of claim 53, when and wherein said lower carbohydrate constituent (b) is comprised of a mixture of a starch and a sugar with the sugar being present in a measurable amount of up to about 25 wt. % of the lower carbohydrate constituent (b) which lower carbohydrate constituent (b) is an included proportion of between about ½ and about 49 wt. %, based on total mixture weight of the involved cellulosic material (a) and lower carbohydrate constituent (b).

56. Using a "wet" sawdust as the mass of cellulosic material (a) in practice of the procedure of claim 55.

57. The procedure of claim 49, when and wherein the sufficient quantity of said strong oxidizing reagent (c) is an amount that is between about 0.001 and about 1 mole of the reagent for each polysaccharide unit in said cellulosic material (a).

58. The procedure of claim 50, when and wherein the sufficient quantity of said strong oxidizing reagent (c) is an amount that is between about 0.001 and about 1 mole of the reagent for each polysaccharide unit in said cellulosic material (a) and each monocarbohydrate unit in said lower carbohydrate constituent (b).

59. The procedure of claim 49, when and wherein said strong oxidizing reagent (c) is comprised of chlorine.

60. The procedure of claim 49, when and wherein said strong oxidizing reagent (c) is an aqueous solution of sodium hypochlorite.

61. The procedure of claim 49, when and wherein said strong oxidizing reagent (c) is chlorine.

62. The procedure of claim 50, when and wherein said strong oxidizing reagent (c) is comprised of chlorine.

63. The procedure of claim 50, when and wherein said strong oxidizing reagent (c) is an aqueous solution of sodium hypochlorite.

64. The procedure of claim 50, when and wherein said strong oxidizing reagent (c) is chlorine.

65. A procedure that is in accordance with any one of the procedures of claims 49–64, inclusive, when and wherein said Step (II) is continued until between about 10 and about 60 wt. % of said cellulosic material (a) is rendered more or less water-soluble by said reaction thereof with said strong oxidizing reagent (c).

66. A procedure that is in accordance with any one of the procedures of claims 49–64, inclusive, when and wherein said Step (II) is continued until there is generated by said reaction of said strong oxidizing reagent (c) between about 5 and about 15 wt. %, based on total weight of the mass treated, of binding material intrinsically provided by and from transformation of the ingredients of said mass by and as a resultant of the action thereon of said strong oxidizing reagent (c).

67. A procedure that is in accordnce with any one of the procedures of claims 49–64, inclusive, and including in complement thereto and further combination therewith the additional Step of:

(II-A) removing from and out of said treated mass, as spent treating liquor effluent, at least a portion of the reacted strong oxidizing reagent (c) remains after the Step II reaction of the reagent with the therewith-treated mass.

68. A procedure that is in accordnce with that of claim 65 and including in complement thereto and further combination therewith the additional Step of:

(II-A) removing from and out of said treated mass, as spent treating liquor effluent, at least a portion of the reacted strong oxidizing reagent (c) remains after the Step II reaction of the reagent with the therewith-treated mass.

69. A procedure that is in accordance with that of claim 66 and including in complement thereto and further combination therewith the additional Step of:

(II-A) removing from and out of said treated mass, as spent treating liquor effluent, at least a portion of the reacted strong oxidizing reagent (c) remains after the Step II reaction of the reagent with the therewith-treated mass.

70. A procedure that is in accordance with any one of the procedures of claims 49–64, inclusive, and including in complement thereto and further combination therewith the additional Steps of:
- (II-A) removing from and out of said treated mass, as spent treating liquor effluent, at least a portion of the reacted strong oxidizing reagent (c) remains after the Step II reaction of the reagent with the therewith-treated mass;
- (V) reconstituting by fortification with active oxidizing reagent ingredients said spent treating liquor effluent from said Step II-A to a desired strength at least approximative of the strength of the original strong oxidizing reagent (c); then
- (VI) re-using at least a portion of said reconstituted spent treating liquor from said Step V by recycle thereof into and for said Step I treatment.

71. A procedure that is in accordance with that of claim 65 and including in complement thereto and further combination therewith the additional Steps of:
- (II-A) removing from and out of said treated mass, as spent treating liquor effluent, at least a portion of the reacted strong oxidizing reagent (c) remains after the Step II reaction of the reagent with the therewith-treated mass;
- (V) reconstituting by fortification with active oxidizing reagent ingredients said spent treating liquor effluent from said Step II-A to a desired strength at least approximative of the strength of the original strong oxidizing reagent (c); then
- (VI) re-using at least a portion of said reconstituted spent treating liquor from said Step V by recycle thereof into and for said Step I treatment.

72. A procedure that is in accordnce with that of claim 66 and including in complement thereto and further combination therewith the additional Steps of:
- (II-A) removing from and out of said treated mass, as spent treating liquor effluent, at least a portion of the reacted strong oxidizing reagent (c) remains after the Step II reaction of the reagent with the therewith-treated mass;
- (V) reconstituting by fortification with active oxidizing reagent ingredients said spent treating liquor effluent from said Step II-A to a desired strength at least approximative of the strength of the original strong oxidizing reagent (c); then
- (VI) re-using at least a portion of said reconstituted spent treating liquor from said Step V by recycle thereof into and for said Step I treatment.

73. A procedure that is in accordance with any one of the procedures of claims 49–64, inclusive, and including in complement thereto and further combination therewith the additional Steps of:
- (VII) conducting said physical forming Step III and said curing Step IV with exertion of compacting, compressive pressure on said treated mixture mass; and the
- (VIII) carrying-out of said curing Step IV with the facilitation of non-decomposing heat at an elevated temperature applied to said finished article shape.

74. A procedure that is in accordance with that of claim 65 and including in complement thereto and further combination therewith the additional Steps of:
- (VII) conducting said physical forming Step III and said curing Step IV with exertion of compacting, compressive pressure on said treated mixture mass; and the
- (VIII) carrying-out of said curing Step IV with the facilitation of non-decomposing heat at an elevated temperature applied to said finished article shape.

75. A procedure that is in accordance with that of claim 66 and including in complement thereto and further combination therewith the additional Steps of:
- (VII) conducting said physical forming Step III and said curing Step IV with exertion of compacting, compressive pressure on said treated mixture mass; and the
- (VIII) carrying-out of said curing Step IV with the facilitation of non-decomposing heat at an elevated temperature applied to said finished article shape.

76. A procedure that is in accordance with that of claim 68 and including in complement thereto and further combination therewith the additional Steps of:
- (VII) conducting said physical forming Step III and said curing Step IV with exertion of compacting, compressive pressure on said treated mixture mass; and the
- (VIII) carrying-out of said curing Step IV with the facilitation of non-decomposing heat at an elevated temperature applied to said finished article shape.

77. A procedure that is in accordance with that of claim 69 and including in complement thereto and further combination therewith the additional Steps of:
- (VII) conducting said physical forming Step III and said curing Step IV with exertion of compacting, compressive pressure on said treated mixture mass; and the
- (VIII) carrying-out of said curing Step IV with the facilitation of non-decomposing heat at an elevated temperature applied to said finished article shape.

78. A procedure that is in accordance with either one of the procedures of claim 49 or claim 50 and including in complement thereto and further combination therewith the additional Step of:
- (II-A) thoroughly interblending with the treated mass from Step II and prior to commencement of said Step III
  - (i) a measurable proportion of an untreated "wet" cellulosic material, which proportion is not in substantial excess of about 3 parts by weight (i.e., "pbw") of said untreated "wet" cellulosic material for each pbw of treated "wet" cellulosic material (a) included in said interblending.

79. The procedure of claim 78, when and wherein both the untreated and treated cellulosic materials (i) and (a) are "wet" sawdust.

80. The procedure of claim 78, when and wherein the pbw ratio of untreated "wet" cellulosic material (i) to treated "wet" cellulosic material (a) is respectively about 1:1.

81. The procedure of claim 80, when and wherein untreated "wet" sawdust and treated "wet" sawdust are used for the interblending of said Step II-B in practice thereof.

82. A composition that is in accordance with either one of those of claim 1 or claim 2 and containing, in additional compositional admixture therein and combination therewith:
- (i) a measurable proportion of an untreated "wet" cellulosic material, which proportion is not in substantial excess of about 3 pbw of said untreated "wet" cellulosic material for each pbw of treated "wet" cellulosic material (a) in the composition.

83. The composition of claim 82, wherein both the untreated "wet" cellulosic material (i) and the treated "wet" cellulosic material (a) are "wet" sawdust.

84. The composition of claim 82, wherein the pbw ratio of both said untreated "wet" cellulosic material (i) and said treated "wet" cellulosic material (a) is respectively on an order of about 1:1.

85. A fabricated shaped and integrally-bonded article of manufacture that has been prepared by subjection to bonding conditions of a composition that is in accordance with that of claim 82.

86. A fabricated shaped and integrally-bonded article of manufacture that has been prepared by subjection to bonding conditions of a composition that is in accordance with that of claim 83.

87. A fabricated shaped and integrally-bonded article of manufacture that has been prepared by subjection to bonding conditions of a composition that is in accordance with that of claim 84.

88. An article of manufacture pursuant to that of claim 87 wherin its componential ingredients are substantially entirely of and from "wet" sawdust.

89. A composition that is in accordance with any one of those of claims 1-6, inclusive, and which is further characterizable in containing and having available for integral-bonding purposes an adequate componential amount and quantity for the compositional binding and resulting structural integrity on fabrication thereof of binding material that has been generated by the action of said strong oxidizing reagent (c) on either said fibrous plant cellulosic material (a) or said lower carbohydrate constituent (b), or both.

90. A fabricated shaped and integrally-bonded article of manufacture that has been prepared by subjection to bonding conditions of a composition that is in accordance with that of claim 89.

91. A procedure that is in accordance with any one of the procedures of claims 49-64, inclusive, when and wherein said Step (II) is continued until there is generated by said reaction of said strong oxidizing reagent (c) an adequate componential amount and quantity for the compositional binding and resulting structural integrity on fabrication of the involved compositional mass being treated of binding material intrinsically provided by and from transformation of the ingredients of said mass by and as a resultant of the action thereon of said strong oxidizing reagent (c).

92. As an article of manufacture in accordance with claim 37, wherein said integrally-bonded cellulosic fabrication is embodied as a composite fabricated structure with another distinct solid material of construction.

93. As an article of manufacture in accordance with claim 38, wherein said integrally-bonded cellulosic fabication is embodied as a composite fabricated structure with another distinct solid material of construction.

94. As an article of manufacture in accordance with claim 39, wherein said integrally-bonded cellulosic fabrication is embodied as a composite fabricated structure with another distinct solid material of construction.

95. As an article of manufacture in accordance with claim 40, wherein said integrally-bonded cellulosic fabrication is embodied as a composite fabricated structure with another distinct solid material of construction.

96. As an article of manufacture in accordance with claim 41, wherein said integrally-bonded cellulosic fabrication is embodied as a composite fabricated structure with another distinct solid material of construction.

97. As an article of manufacture in accordance with claim 42, wherein said integrally-bonded cellulosic fabrication is embodied as a composite fabricated structure with another distinct solid material of construction.

* * * * *